(12) United States Patent
Tatsumi et al.

(10) Patent No.: US 11,597,279 B2
(45) Date of Patent: Mar. 7, 2023

(54) SYSTEM FOR MANAGING RAILWAY VEHICLE INSTRUMENT, AND ON-BOARD APPARATUS FOR MANAGING RAILWAY VEHICLE INSTRUMENT

(71) Applicant: Mitsubishi Electric Corporation, Tokyo (JP)

(72) Inventors: Shogo Tatsumi, Tokyo (JP); Tokiko Takeuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 491 days.

(21) Appl. No.: 16/469,247

(22) PCT Filed: Nov. 2, 2017

(86) PCT No.: PCT/JP2017/039676
§ 371 (c)(1),
(2) Date: Jun. 13, 2019

(87) PCT Pub. No.: WO2018/142697
PCT Pub. Date: Aug. 9, 2018

(65) Prior Publication Data
US 2020/0101991 A1    Apr. 2, 2020

(30) Foreign Application Priority Data
Jan. 31, 2017   (JP) .............................. JP2017-015425

(51) Int. Cl.
*G06F 7/00*       (2006.01)
*B60L 3/00*       (2019.01)
*B61L 3/00*       (2006.01)

(52) U.S. Cl.
CPC ................. *B60L 3/00* (2013.01); *B61L 3/006* (2013.01)

(58) Field of Classification Search
CPC ........ B60L 3/00; B60L 3/0061; B60L 3/0076; B60L 2200/26; B60L 3/12; B61L 3/006;
(Continued)

(56) References Cited

U.S. PATENT DOCUMENTS

2010/0312461 A1* 12/2010 Haynie ................. B61L 25/025
701/117
2012/0329402 A1* 12/2012 Ren ........................ H04W 24/10
455/67.11

(Continued)

FOREIGN PATENT DOCUMENTS

JP    H08251702 A    9/1996
JP    2001-347948 A   12/2001
(Continued)

OTHER PUBLICATIONS

International Search Report (PCT/ISA/210) and translation and Written Opinion (PCT/ISA/237) dated Jan. 23, 2018, by the Japan Patent Office as the International Searching Authority for International Application No. PCT/JP2017/039676.

(Continued)

*Primary Examiner* — Shardul D Patel
(74) *Attorney, Agent, or Firm* — Buchanan Ingersoll & Rooney PC

(57) ABSTRACT

It makes it possible to track instrument information and to obtain an accurate history of the instrument information, even when a mounting position mounted with a railway vehicle instrument has been changed. Instrument information indicating an operation or a state of a railway vehicle instrument mounted to each mounting position included in a composition is collected. A serial number determined for each mounting position is updated. The instrument information is assigned with a temporary ID including position information specifying the each mounting position and a serial number. A combination of a new temporary ID and an (Continued)

old temporary ID included in the temporary ID group and assigned to new instrument information and old instrument information indicating an operation or a state of a same railway vehicle instrument is estimated.

16 Claims, 10 Drawing Sheets

(58) Field of Classification Search
CPC .. B61L 27/0094; B61L 27/0077; B61L 25/04; G06F 7/00
USPC .......................................................... 701/19
See application file for complete search history.

(56) References Cited

U.S. PATENT DOCUMENTS

| | | | | |
|---|---|---|---|---|
| 2015/0220847 A1* | 8/2015 | Shibuya | ............. | G05B 23/0227 706/12 |
| 2017/0235848 A1* | 8/2017 | Van Dusen | ............. | G06F 30/20 705/12 |

FOREIGN PATENT DOCUMENTS

| | | | |
|---|---|---|---|
| JP | 2005168203 A | 6/2005 | |
| JP | 2014-230353 A | 12/2014 | |

OTHER PUBLICATIONS

Office Action dated Nov. 15, 2021, in corresponding India Patent Application No. 201947028116, with English translation. (6 pages).

\* cited by examiner

| | OLD TEMPORARY ID | NEW TEMPORARY ID |
|---|---|---|
| 1240 | H012-03-V02-3873986  ~1280 | H012-03-V01-2383175  ~1260 |
| 1241 | H012-03-V01-2383174  ~1281 | H012-03-V02-3873987  ~1261 |
| 1242 | H012-02-B01-3123451  ~1282 | H012-02-B01-3123452  ~1262 |

1220, 1200

SYSTEM FOR MANAGING RAILWAY VEHICLE INSTRUMENT, AND ON-BOARD APPARATUS FOR MANAGING RAILWAY VEHICLE INSTRUMENT

TECHNICAL FIELD

The present invention relates to a system for managing railway vehicle instrument, and an on-board apparatus for managing railway vehicle instrument.

BACKGROUND ART

In railways, in order to achieve stable operation and safe operation, it is obliged to perform maintenance work such as inspection and repair of railway vehicle instrument periodically, every time a travel distance reaches a certain distance, or in accordance with a situation. However, in a case of manually performing maintenance of each of a large number of railway vehicle instruments, an enormous cost is required.

Therefore, it may be considered to adopt a technique of collecting a large number of pieces of instrument information that individually indicate an operation or a state of a large number of railway vehicle instruments, and using for maintenance of the large number of railway vehicle instruments.

In this technique, the large number of railway vehicle instruments are connected to a network, and integrated management of the large number of railway vehicle instruments is performed by a vehicle management apparatus called a monitor apparatus. The vehicle management apparatus collects instrument information of the large number of railway vehicle instruments, and aggregates the collected instrument information on a server on the ground. The aggregated instrument information is used to confirm an operation or a state of each railway vehicle instrument, which is each of the large number of railway vehicle instruments. The instrument information of each railway vehicle instrument may be represented by a value, or may be represented by other than a value. The instrument information represented by a value is an operating time of each railway vehicle instrument, an operation count of each railway vehicle instrument, a fluctuation history of a voltage applied in each railway vehicle instrument, a fluctuation history of a current having flowed in each railway vehicle instrument, a fluctuation history of a temperature of each railway vehicle instrument, and the like. The instrument information represented by other than a value is a failure diagnosis result notified from each railway vehicle instrument, and the like. The instrument information of each railway vehicle instrument is to be the basis of determination of a deterioration state, necessity of repair, and the like of each railway vehicle instrument.

A technique described in Patent Document 1 relates to management of a railway vehicle mounted instrument (title of the invention). In the technique described in Patent Document 1, an instrument identification number is given to the railway vehicle mounted instrument (paragraph 0017). In a recording unit provided in the railway vehicle mounted instrument, maintenance management characteristic values such as a time, a number of times, and a distance are recorded (paragraph 0028). The instrument identification number is set as an ID (paragraph 0029, paragraph 0030, and FIG. 1). Organized maintenance management information is grasped, a history of the railway vehicle mounted instrument is monitored, and maintenance information is issued (paragraph 0030, paragraph 0031, and FIG. 1).

A technique described in Patent Document 2 relates to management of a vehicle component (title of the invention). In the technique described in Patent Document 2, a component mounted to a train composition is registered in a component database (paragraph 0011). Travel distance data of the registered component is stored in the component database (paragraph 0011). A composition number and a travel distance corresponding to the composition number are received from an operation management system (paragraph 0011). The received travel distance is added to the travel distance data of the component mounted to the train composition (paragraph 0011). The travel distance data is updated when the component is replaced or a mounting position is changed (paragraph 0011). If there arises a component having a cumulative travel distance or a travel distance from a previous inspection or replacement exceeding a threshold value, an alarm is outputted (paragraph 0011).

PRIOR ART DOCUMENTS

Patent Documents

Patent Document 1: Japanese Patent Application Laid-Open No. 8-251702 (1996)
Patent Document 2: Japanese Patent Application Laid-Open No. 2005-168203

SUMMARY

Problem to be Solved by the Invention

In order to use a past history of instrument information collected in the above technique for maintenance of each railway vehicle instrument, it is necessary to specify which railway vehicle instrument each piece of instrument information included in the collected instrument information belongs to, track a time change of instrument information indicating an operation or a state of each railway vehicle instrument, and obtain an accurate history of instrument information indicating an operation or a state of each railway vehicle instrument. However, in maintenance on a railway, such work of mutually replacing a railway vehicle instrument mounted to one vehicle and a railway vehicle instrument mounted to another vehicle may be performed, and a mounting position mounted with the railway vehicle instrument may be changed. For this reason, in the above technique, it is required to track a time change of the instrument information indicating an operation or a state of each railway vehicle instrument so as to be able to obtain an accurate history of the instrument information indicating an operation or a state of each railway vehicle instrument, even when the mounting position mounted with the railway vehicle instrument has been changed.

When the technique described in Patent Document 1 is adopted, it is specified, by the instrument identification number, which one of the railway vehicle mounted instruments the maintenance management characteristic value belongs to. Therefore, according to the technique described in Patent Document 1, a time change of the maintenance management characteristic value is tracked, an accurate history of the maintenance management characteristic value is obtained, and the above-mentioned requirement is satisfied. Whereas, when the technique described in Patent Document 1 is adopted, the railway vehicle mounted instrument must have a memory area to store the instrument identification number, and a mechanism to read out and transmit the stored instrument identification number. In addition, the railway vehicle must be provided with a mechanism to receive the instrument identification number from the railway vehicle mounted instrument. However, many existing railway vehicle mounted instruments do not have a memory area to store the instrument identification number, and a mechanism to read out and transmit the stored instrument identification number. In addition, many existing vehicles are not provided with a mechanism to receive the instrument identification number from the railway vehicle mounted instrument. For this reason, in order for the railway vehicle mounted instrument to have a memory area to store the instrument identification number, and a mechanism to read out and transmit the stored instrument identification number, and in order for the railway vehicle to be provided with a mechanism to receive the instrument identification number from the railway vehicle mounted instrument, software updates and the like for a large number of railway vehicles and a large number of railway vehicle mounted instruments are required, causing an enormous cost. Therefore, there are obstacles in adopting the technique described in Patent Document 1.

When the technique described in Patent Document 2 is adopted, it is specified by the component database which vehicle component the travel distance data belongs to. For this reason, according to the technique described in Patent Document 2, a time change of the travel distance data is tracked, an accurate history of the travel distance data is obtained, and the above-mentioned requirement is satisfied. Whereas, when the technique described in Patent Document 2 is adopted, a component mounted to a train composition must be correctly registered in the component database, and the above-mentioned requirement will not be satisfied if the registration work is not performed or is incorrectly performed.

An object of the present invention is to solve this problem. An object of the present invention is to make it possible to track instrument information indicating an operation or a state of a railway vehicle instrument and to obtain an accurate history of instrument information, even when a mounting position mounted with the railway vehicle instrument has been changed. Further, an object of the present invention is to eliminate necessity of constructing a mechanism to identify the railway vehicle instrument itself in order to obtain an accurate history of instrument information.

Means to Solve the Problem

The present invention is directed to a system for managing railway vehicle instrument.

A system for managing railway vehicle instrument includes a collection unit, an assignment unit, a database, and an estimation unit.

The collection unit collects instrument information indicating an operation or a state of a railway vehicle instrument mounted to each mounting position that is each of at least one mounting position included in a composition.

The assignment unit updates a to-be-updated identifier that is determined for each mounting position. Further, the assignment unit assigns, to the instrument information, a temporary identifier including position information specifying the each mounting position and the to-be-updated identifier.

The database stores an instrument information group and a temporary identifier group.

The estimation unit estimates a combination of temporary identifiers included in the stored temporary identifier group and assigned to pieces of instrument information indicating an operation or a state of a same railway vehicle instrument.

The present invention is also directed to an on-board apparatus for managing railway vehicle instrument, which constitute a system for managing railway vehicle instrument.

Effects of the Invention

According to the present invention, even in a case where replacement of a railway vehicle instrument mounted to a mounting position is performed, it is possible to track instrument information indicating an operation or a state of the railway vehicle instrument, and to obtain an accurate history of the instrument information. Further, it is not necessary to construct a mechanism to identify the railway vehicle instrument itself in order to obtain an accurate history of instrument information.

Objects, features, aspects, and advantages of the present invention will become more apparent from the following detailed description and the accompanying drawings.

DESCRIPTION OF EMBODIMENTS

1. First Embodiment

1.1 System for Managing Railway Vehicle Instrument

A first embodiment relates to a system for managing railway vehicle instrument.

Figure 1:
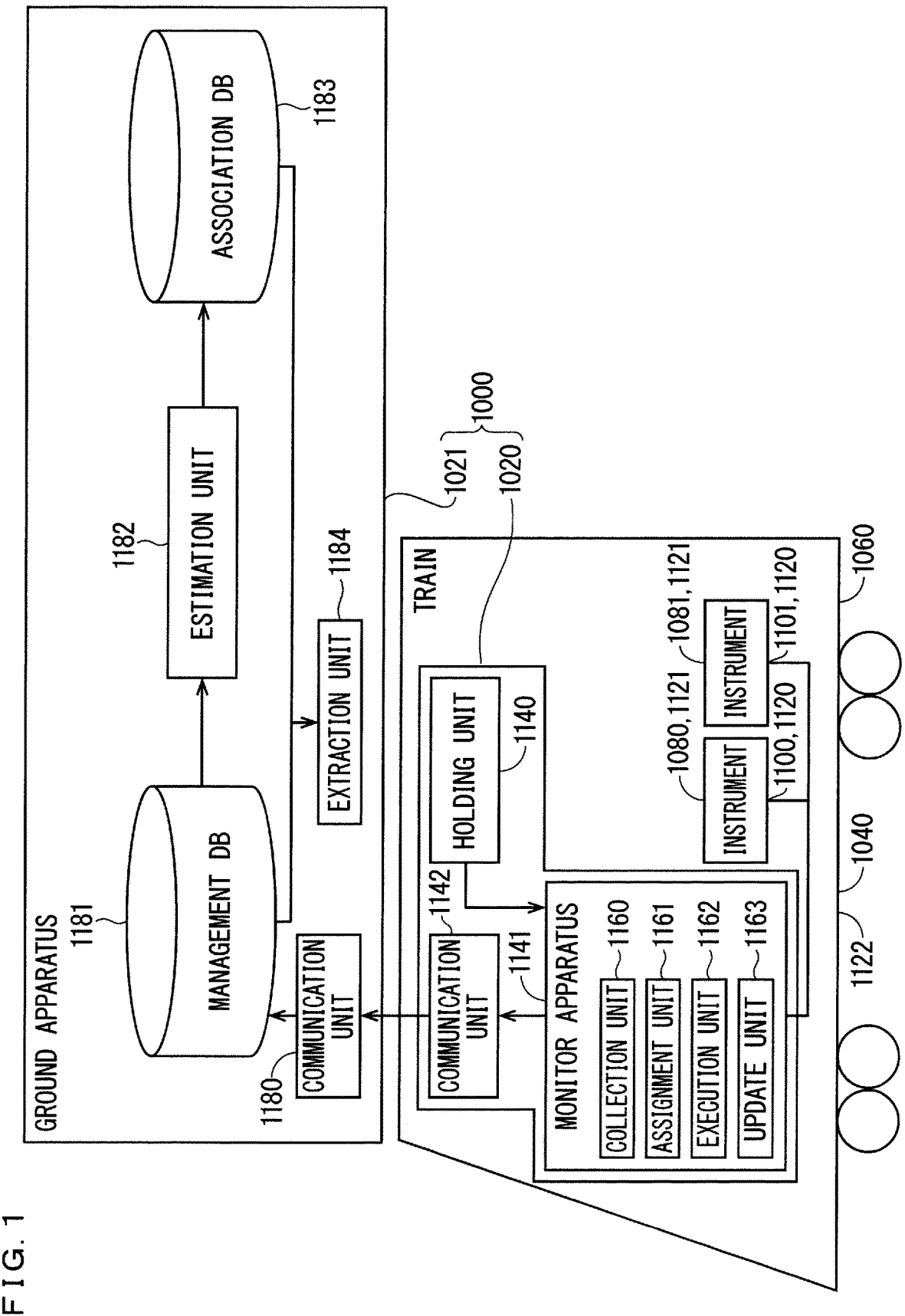
FIG. 1 is a block diagram illustrating a system for managing railway vehicle instrument according to a first embodiment.
Figure 2:
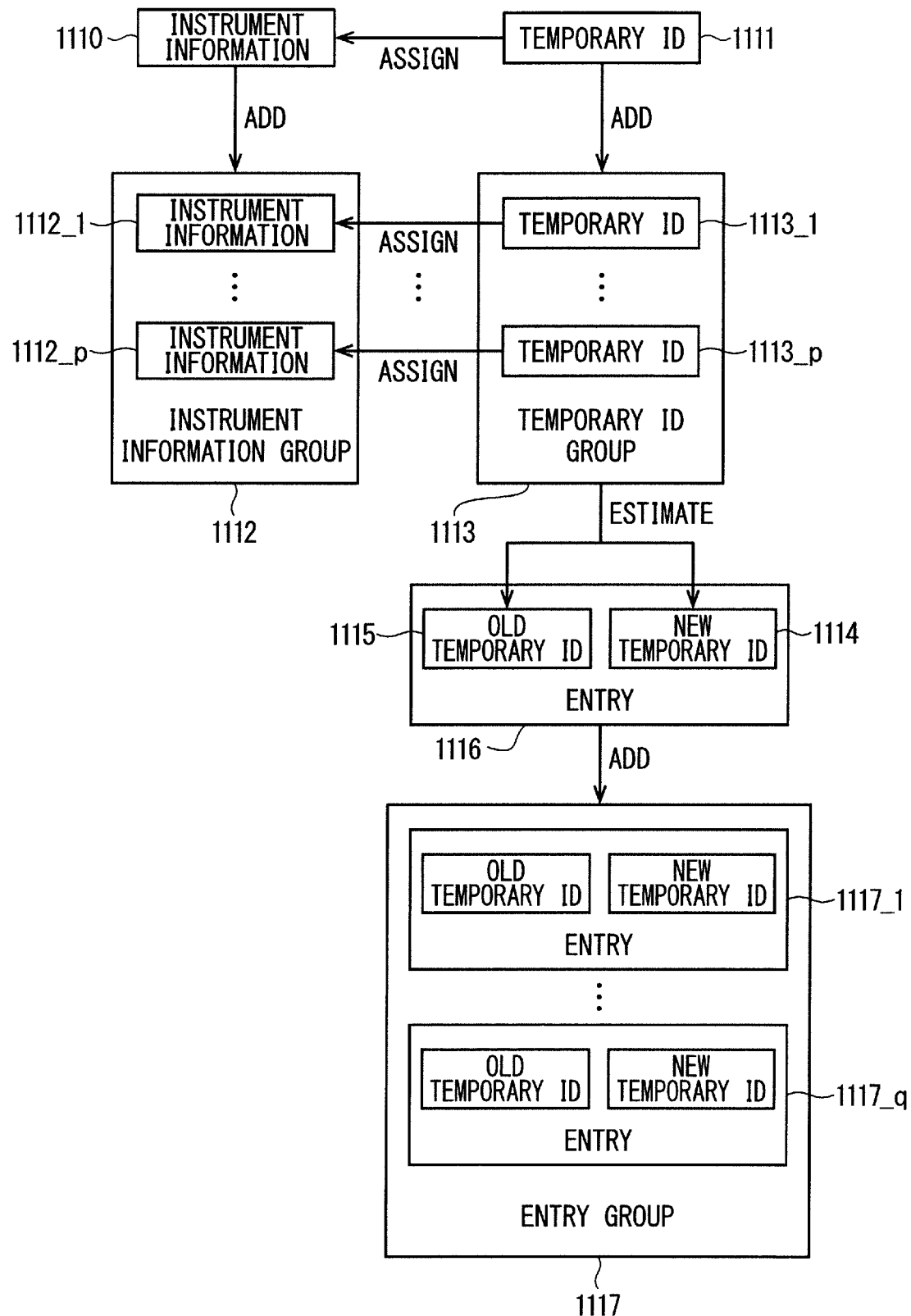
FIG. 2 is a diagram illustrating a flow of information processing in a system for managing railway vehicle instrument according to a first, second, and third embodiments.
Figures 3, 4:
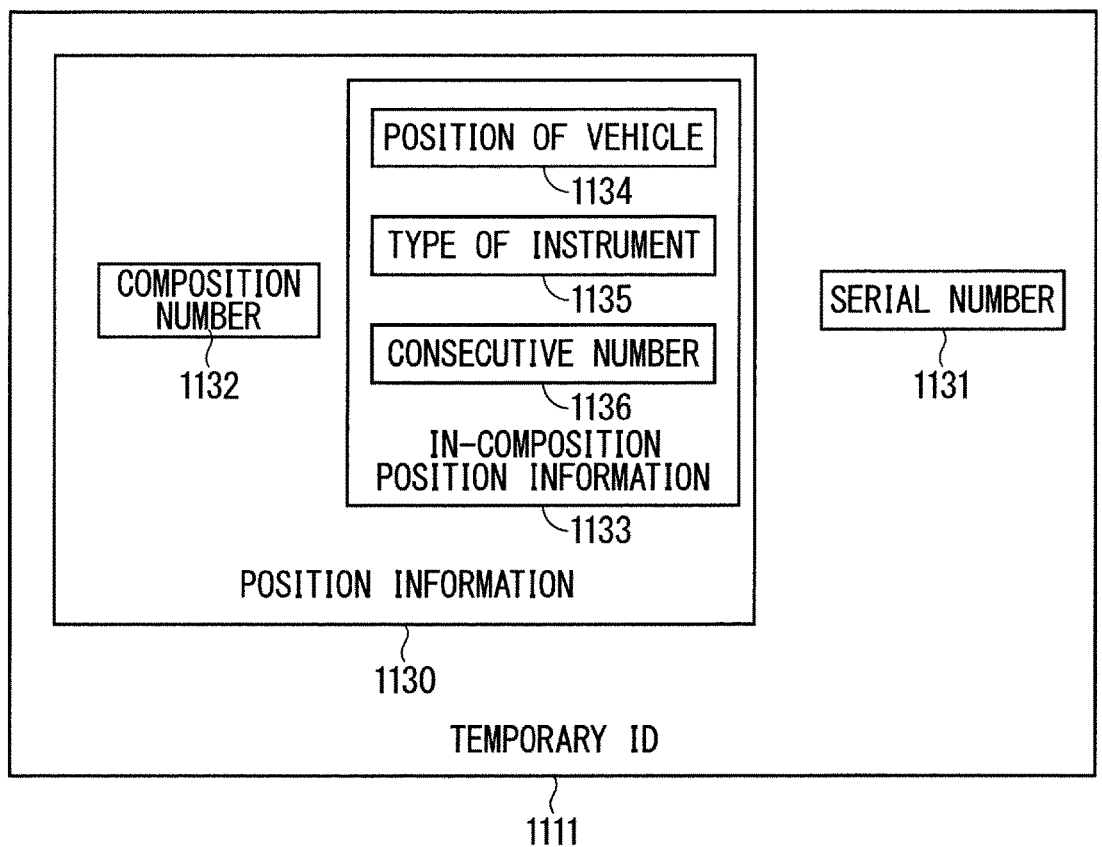
FIG. 3 is a diagram illustrating a data structure of a temporary identifier (temporary ID) to be processed in the system for managing railway vehicle instrument according to the first, second, and third embodiments.
FIG. 4 is a view illustrating an example of a table stored in an association database (association DB) provided in the system for managing railway vehicle instrument according to the first, second, and third embodiments.

FIG. 1 is a block diagram illustrating the system for managing railway vehicle instrument according to the first embodiment. FIG. 2 is a diagram illustrating a flow of information processing in the system for managing railway vehicle instrument according to the first embodiment. FIG. 3 is a diagram illustrating a data structure of a temporary identifier (temporary ID) to be processed in the system for managing railway vehicle instrument according to the first embodiment.

A system 1000 for managing railway vehicle instrument illustrated in FIG. 1 is used to monitor an operation status of the railway vehicle instrument and improve efficiency of maintenance, inspection, and repair. The system 1000 includes an on-board apparatus 1020 and a ground apparatus 1021 for managing railway vehicle instrument. The system 1000 may include constituent components other than these constituent components.

The on-board apparatus 1020 is equipped to each composition 1040 that is each of at least one composition. The ground apparatus 1021 is installed on the ground. Each composition 1040 is a train.

Each composition 1040 includes a lead vehicle 1060. Each composition 1040 may include a following vehicle in addition to the lead vehicle 1060. The lead vehicle 1060 includes instruments 1080 and 1081, and has mounting positions 1100 and 1101. The instruments 1080 and 1081 are respectively mounted to the mounting positions 1100 and 1101, and managed by the system 1000. Each composition 1040 includes a plurality of instruments including the instruments 1080 and 1081, and has a plurality of mounting positions including the mounting positions 1100 and 1101. The plurality of instruments are individually mounted to the plurality of mounting positions, and managed by the system 1000. Each of the plurality of instruments is a railway vehicle instrument such as a motor, a brake, an inverter, an air conditioning apparatus (hereinafter, air conditioner), or a door. It is also permitted that each composition 1040 has only one instrument managed by the system 1000, and each composition 1040 has only one mounting position to be mounted with the instrument managed by the system 1000.

In the system 1000, as illustrated in FIGS. 2 and 3, instrument information 1110 and a temporary identifier (temporary ID) 1111 are processed. The instrument information 1110 indicates an operation or a state of an instrument 1121 mounted to each mounting position 1120, which is each of the plurality of mounting positions.

The temporary ID 1111 includes position information 1130 and a serial number 1131. The position information 1130 identifies each mounting position 1120 in at least one composition. The serial number 1131 is determined for each mounting position 1120, and updated at a timing when replacement of the instrument 1121 mounted to each mounting position 1120 is possibly performed. The serial number 1131 that is a to-be-updated identifier represented by a number may be replaced with a to-be-updated identifier represented by other than a number.

The position information 1130 includes a composition number 1132 and in-composition position information 1133. The composition number 1132 identifies each composition 1040 from other compositions. The composition number 1132 that is a composition identifier represented by a number may be replaced with a composition identifier represented by other than a number. The in-composition position information 1133 identifies each mounting position 1120 in each composition 1040.

The in-composition position information 1133 includes information 1134 specifying a position within each composition 1040 of a vehicle 1122 having each mounting position 1120, and information 1135 indicating a type of an instrument that can be mounted to each mounting position 1120. In a case where the vehicle 1122 has a plurality of mounting positions that can be mounted with the instrument 1121 mounted to each mounting position 1120, the in-composition position information 1133 further includes a consecutive number 1136 specifying which of the mounting positions each mounting position 1120 is. The consecutive number 1136 that is information represented by a number may be replaced with information represented by other than a number. The in-composition position information 1133 is information specifying, for example, as being a first brake of a second vehicle. The position information 1130 is information specifying, for example, as being a first brake of a second vehicle of a composition whose composition number is H012.

In the system 1000, the on-board apparatus 1020 transmits the instrument information 1110 to the ground apparatus 1021. The ground apparatus 1021 adds the received instrument information 1110 to a stored instrument information group 1112.

Further, in the system 1000, the on-board apparatus 1020 assigns the temporary ID 1111 to the instrument information 1110 to be transmitted. The ground apparatus 1021 adds the temporary ID 1111 assigned to the received instrument information 1110, to a stored temporary ID group 1113.

Furthermore, in the system 1000, the ground apparatus 1021 estimates a combination of a new temporary ID 1114 and an old temporary ID 1115 included in the stored temporary ID group 1113 and respectively assigned to new instrument information and old instrument information that indicate an operation or a state of a same instrument but have been collected in different time zones. As a result, even in a case where replacement of an instrument 1121 mounted to each mounting position 1120 is performed, the mounting position mounted with the instrument 1121 can be tracked, the instrument information 1110 indicating an operation or a state of the instrument 1121 can be tracked, and an accurate history of the instrument information 1110 can be obtained. Further, it is not necessary to construct a mechanism to identify the instrument 1121 itself in order to obtain an accurate history of the instrument information 1110.

1.2 On-Board Apparatus

As illustrated in FIG. 1, the on-board apparatus 1020 is equipped to the lead vehicle 1060, and includes a holding unit 1140, a monitor apparatus 1141, and a communication unit 1142. The monitor apparatus 1141 includes a collection unit 1160 and an assignment unit 1161. These constituent components are realized by causing a computer equipped to the on-board apparatus 1020 to execute software. These constituent components may be realized by hardware that does not execute software. The on-board apparatus 1020 may include constituent components other than these constituent components. In a case where each composition 1040 has a following vehicle, the on-board apparatus 1020 may be equipped to the following vehicle.

The holding unit 1140 holds the composition number 1132.

The monitor apparatus 1141 is communicably connected to the instrument 1121 mounted to each mounting position 1120, which is each of the plurality of mounting positions, via a transmission path.

The collection unit 1160 collects the instrument information 1110 indicating an operation or a state of the instrument 1121 mounted to each mounting position 1120, and records the collected instrument information 1110.

The instrument information 1110 may include information electronically recorded on the instrument 1121 mounted to each mounting position 1120, a measurement value of the instrument 1121, and the like. The information electronically recorded in the instrument 1121 may include an operation count of a component provided in the instrument 1121, an accumulated energization time of the instrument 1121, and the like. The measurement value may include a measurement value of a current having flowed in the instrument 1121, a measurement value of a voltage applied to the instrument 1121, a measurement value of a temperature in the instrument 1121, a measurement value of characteristics of components included in the instrument 1121, and the like. The measurement value of characteristics of the components included in the instrument 1121 may include a measurement value of luminance of a light emitting diode (LED) constituting a display, illumination, and the like, a measurement value of a capacitance of a filter capacitor that constitutes an inverter, or the like.

Further, the collection unit 1160 acquires the composition number 1132 from the holding unit 1140, and determines the in-composition position information 1133 on the basis of an internet protocol address (IP address) on a network. The collection unit 1160 determines the position information 1130 including the acquired composition number 1132 and the determined in-composition position information 1133, and distinguishes the instrument 1121 mounted to each mounting position 1120 by the determined position information 1130.

The assignment unit 1161 determines the serial number 1131 for each mounting position 1120, and updates the serial number 1131 determined for each mounting position 1120 at a timing when replacement of the instrument 1121 mounted to each mounting position 1120 is possibly performed, such as a timing when maintenance is performed. The determined serial number 1131 is stored in a memory capable of holding stored information regardless of power off/on. The serial number 1131 is determined so as not to overlap with a past serial number 1131. For example, by incrementing the serial number 1131 by 1 at each arrival of the timing when replacement of the instrument 1121 mounted to each mounting position 1120 is possibly performed, the serial number 1131 is managed so as not to overlap with the past serial number 1131.

Further, the assignment unit 1161 acquires the composition number 1132 from the holding unit 1140, determines the in-composition position information 1133, assigns, to the collected instrument information 1110, the temporary ID 1111 including the position information 1130 that includes the acquired composition number 1132 and the determined in-composition position information 1133 and further including the determined serial number 1131, and assigns time information specifying a time to the collected instrument information 1110.

The temporary ID 1111 is represented by a character string in which a plurality of pieces of information included in the temporary ID 1111 are connected to each other by a connector. For example, the temporary ID 1111 is expressed by "H012-02-B01-3123451" in which a connector "-" mutually connects "H012" indicating a composition number H012, "02" indicating a second vehicle, "B01" indicating a second brake, and "3123451" that is a serial number, included in the temporary ID 1111. The temporary ID 1111 may be expressed in an expression method different from this expression method. For example, the temporary ID 1111 may be expressed by binary data obtained by encoding a plurality of pieces of information included in the temporary ID 1111.

The communication unit 1142 transmits the collected instrument information 1110 and the temporary ID 1111 assigned to the instrument information 1110, to the ground apparatus 1021.

1.3 Ground Apparatus

As illustrated in FIG. 1, the ground apparatus 1021 includes a communication unit 1180, a management database (management DB) 1181, an estimation unit 1182, an association database (association DB) 1183, and an extraction unit 1184. These constituent components are realized by causing a computer equipped to the ground apparatus 1021 to execute software. These constituent components may be realized by hardware that does not execute software.

The communication unit 1180 receives, from the on-board apparatus 1020, the instrument information 1110 and the temporary ID 1111 assigned to the instrument information 1110.

The management DB 1181 stores the instrument information group 1112 and the temporary ID group 1113. p pieces of temporary IDs 1113_1 to 1113_p included in the stored temporary ID group 1113 are respectively assigned to p pieces of instrument information 1112_1 to 1112_p included in the stored instrument information group 1112. p is an integer of 2 or more.

Further, the management DB 1181 adds the received instrument information 1110 to the stored instrument information group 1112, and adds the received temporary ID 1111 to the stored temporary ID group 1113. This allows the stored instrument information group 1112 to be updated so as to include the received instrument information 1110. Further, the stored temporary ID group 1113 is updated so as to include the received temporary ID 1111.

When the temporary ID 1111 is assigned to the instrument information 1110, the estimation unit 1182 performs, with the assigned temporary ID 1111 as the new temporary ID 1114, an estimation process to estimate a combination of the new temporary ID 1114 and the old temporary ID 1115 included in the stored temporary ID group 1113 and respectively assigned to new instrument information and old instrument information indicating an operation or a state of a same instrument. Instead of the estimation process to estimate a combination of the new temporary ID 1114 and the old temporary ID 1115 that are two temporally IDs respectively assigned to the new instrument information and the old instrument information that are two pieces of instrument information indicating an operation or a state of a same instrument, an estimation process may be performed to estimate a combination of three or more temporary IDs individually assigned to three or more pieces of instrument information indicating an operation or a state of a same instrument. The estimation process may be performed each time one piece of the instrument information 1110 is received, or may be performed after a plurality of pieces of the instrument information 1110 have been received over a certain period of time.

The association DB 1183 stores an entry group 1117. Each of q pieces of entries 1117_1 to 1117_q included in the stored entry group 1117 includes a new temporary ID and an old temporary ID, and indicates that the new temporary ID and the old temporary ID are associated with each other. q is an integer of 2 or more. When the estimation process is performed, the association DB 1183 associates the new temporary ID 1114 and the old temporary ID 1115 constituting the estimated combination with each other, and adds an entry 1116 including the new temporary ID 1114 and the old temporary ID 1115 associated with each other to the stored entry group 1117. As a result, when the estimation process is performed, the stored entry group 1117 is updated so as to include the entry 1116 indicating that the new temporary ID 1114 and the old temporary ID 1115 constituting the estimated combination are associated with each other.

Depending on a data structure adopted in the association DB 1183, correspondence information indicating that the new temporary ID 1114 and the old temporary ID 1115 are associated with each other may not be an entry.

FIG. 4 is a view illustrating an example of a table stored in the association DB provided in the system for managing railway vehicle instrument according to the first embodiment.

A table 1200 illustrated in FIG. 4 includes an entry group 1220 consisting of entries 1240, 1241, and 1242. The entry group 1220 is an example of the entry group 1117 illustrated in FIG. 2. The entries 1240, 1241, and 1242 respectively include new temporary IDs 1260, 1261, and 1262, and respectively include old temporary IDs 1280, 1281, and 1282. The new temporary IDs 1260, 1261, and 1262 are respectively associated with the old temporary IDs 1280, 1281, and 1282. The new temporary IDs 1260, 1261 and 1262 are assigned immediately after the old temporary IDs 1280, 1281 and 1282 are assigned, respectively.

The extraction unit 1184 extracts, with a specified temporary ID as a primary temporary ID, primary instrument information assigned with the specified primary temporary ID, from the instrument information group 1112 stored in the management DB 1181.

In addition, in a case where i is each integer from 1 to n, the extraction unit 1184 extracts an entry including a new temporary ID that matches an i-th order temporary ID from the entry group 1117 stored in the association DB 1183, takes out the old temporary ID included in the extracted entry, and sets as an (i+1)-th order temporary ID. Thus, in a case where i is each integer from 1 to n, the extraction unit 1184 extracts the (i+1)-th order temporary ID associated with the i-th order temporary ID, from the entry group 1117 stored in the association DB 1183.

Furthermore, the extraction unit 1184 extracts the (i+1)-th order instrument information assigned with the extracted (i+1)-th order temporary ID, from the instrument information group 1112 stored in the management DB 1181. n is an integer of 1 or more, and is selected such that the instrument information collected in an extraction target period is extracted.

As a result, the primary to (n+1)-th order instrument information indicating an operation or a state of a same instrument is extracted, tracking of the instrument information indicating an operation or a state of a same instrument becomes possible, and an accurate history of the instrument information indicating an operation or a state of a same instrument is obtained. Therefore, it is possible to trace back to the past to know an operation or a state of the instrument mounted to a specific mounting position at a specific time. The extraction of the primary to the (n+1)-th order instrument information is also possible in a case where replacement of an instrument mounted to a mounting position is performed. Further, the extraction of the primary to (n+1)-th order instrument information is possible without constructing a mechanism to identify the instrument itself, such as a mechanism for the monitor apparatus 1141 to read an ID for identifying the instrument itself.

1.4 Update Timing of Serial Number

The timing when the serial number 1131 is updated is when power off/on of the vehicle 1122 having each mounting position 1120 is detected by the assignment unit 1161. This is because the power of the vehicle 1122 having each mounting position 1120 is always turned off/on when replacement of the instrument 1121 mounted to each mounting position 1120 is performed.

According to such the timing when the serial number 1131 is updated, the serial number 1131 is updated even if the vehicle 1122 having each mounting position 1120 is accidentally turned off/on. However, in the system 1000, the estimation unit 1182 can estimate a change of a mounting destination of the instrument.

The timing when the serial number 1131 is updated may be when a test function of testing the instrument 1121 mounted to each mounting position 1120 is executed. In this case, as illustrated in FIG. 1, an execution unit 1162 having a test function of testing the instrument 1121 is provided in the monitor apparatus 1141. The test is performed to confirm that the instrument 1121 is properly mounted to each mounting position 1120. If the serial number 1131 is updated when the test function is executed, replacement of the instrument 1121 mounted to each mounting position 1120 is detected more accurately than in a case where the timing when the serial number 1131 is updated is when power off/on of the vehicle 1122 is detected. Therefore, it is possible to more accurately estimate a combination of the new temporary ID 1114 and the old temporary ID 1115 respectively assigned to the new instrument information and the old instrument information indicating an operation or a state of a same instrument.

1.5 First Estimation Process Using Property of Instrument Information Value

In a case where the instrument information 1110 includes an instrument information value having a property of monotonously increasing or decreasing as time passes, the estimation process performed by the estimation unit 1182 may include a first estimation process of selecting a first temporary ID and a second temporary ID from the temporary ID group 1113 stored in the management DB 1181 by using the property of monotonously increasing or decreasing of the instrument information value, and respectively setting the selected first temporary ID and second temporary ID as the new temporary ID 1114 and the old temporary ID 1115.

The first estimation process is performed such that a first time zone in which at least one piece of first instrument information included in the instrument information group 1112 stored in the management DB 1181 and assigned with the first temporary ID has been collected is not overlapped with a second time zone in which at least one piece of second instrument information included in the instrument information group 1112 stored in the management DB 1181 and assigned with the second temporary ID has been collected. This prevents mutual association of two temporary IDs individually assigned to two pieces of instrument information that are collected in overlapping time zones and are not indicating an operation or a state of a same instrument. The first and second time zones are specified from time information assigned to at least one piece of the first and second instrument information, respectively.

Further, the first estimation process is performed such that the first time zone is after the second time zone.

Furthermore, the first estimation process is performed such that a relationship between at least one first instrument information value each included in at least one piece of the first instrument information and at least one second instrument information value each included in at least one piece of the second instrument information is conform to the above-mentioned property. For example, in a case where the instrument information value has a property of monotonously increasing as time passes, the first estimation process is performed such that at least one first instrument information value is greater than at least one second instrument information value. Further, in a case where the instrument information value has a property of monotonously decreasing as time passes, the first estimation process is performed such that at least one first instrument information value is smaller than at least one second instrument information value. This prevents mutual association of two temporary IDs individually assigned to two pieces of instrument information that do not conform to the above-mentioned property and are not indicating an operation or a state of a same instrument.

In addition, the first estimation process is performed such that a first instrument information value collected first in at least one first instrument information value continues from a second instrument information value collected last in at least second one instrument information value. Thus, the first estimation process is performed such that a difference between the first instrument information value and the second instrument information value becomes zero. If the first estimation process cannot be performed such that the difference between the first instrument information value and the second instrument information value becomes zero, the first estimation process may be performed so as to satisfy a condition of indicating continuity different from the condition of indicating continuity in which the difference becomes zero. For example, the first estimation process may be performed such that the difference between the first instrument information value and the second instrument information value is minimized. This causes mutual association of two temporary IDs individually assigned to two pieces of instrument information that are highly likely to indicate an operation or a state of a same instrument.

The instrument information value that is referred to in the first estimation process and has a property of monotonously increasing or decreasing as time passes may be a recorded value electronically recorded on the instrument 1121 mounted to each mounting position 1120, or may be a measured value or the like in the instrument 1121. The record value that can be referred to is an operation count of a component provided in the instrument 1121, an accumulated energization time of the instrument 1121, or the like. The measurement value that can be referred to is a measurement value of a physical quantity of a component that is included in the instrument 1121 and subjected to a secular change, and is a measurement value of a luminance of an LED constituting a display, illumination, and the like, a measurement value of a capacitance of a filter capacitor that constitutes an inverter, or the like.

1.6 First Example of First Estimation Process

Figure 5:
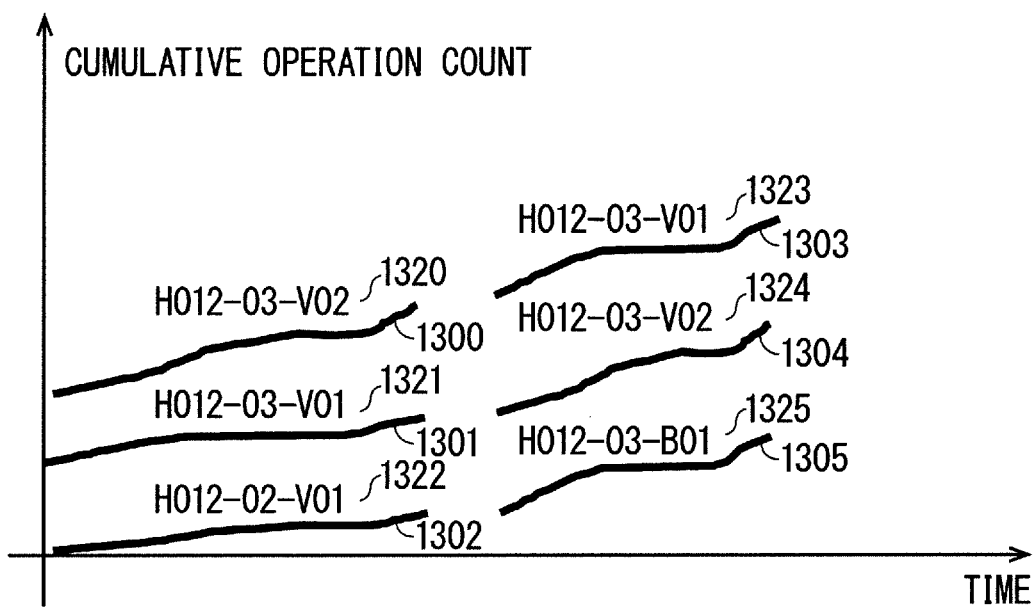
FIG. 5 is a graph illustrating a first example of a change with time of a cumulative operation count stored in a management DB provided in the system for managing railway vehicle instrument according to the first, second, and third embodiments.

FIG. 5 is a graph illustrating a first example of a change with time of a cumulative operation count stored in the management DB provided in the system for managing railway vehicle instrument according to the first embodiment.

Cumulative operation counts 1300, 1301, 1302, 1303, 1304, and 1305 stippled in FIG. 5 are respectively included in pieces of instrument information assigned with temporary IDs 1320, 1321, 1322, 1323, 1324, and 1325. The pieces of instrument information assigned with the temporary IDs 1320, 1321, 1322, 1323, 1324, and 1325 indicate an operation or a state of an instrument of a same type.

In the following, one combination is expressed using a rule that the old temporary ID 1115 and the new temporary ID 1114 constituting one combination are respectively described first and second in parentheses.

Time zones in which the cumulative operation counts 1300, 1301, and 1302 have been collected are overlapped with each other, and time zones in which the cumulative operation counts 1303, 1304, and 1305 have been collected are overlapped with each other. However, the time zones in which the cumulative operation counts 1303, 1304, and 1305 have been collected are not overlapped with the time zones in which the cumulative operation counts 1300, 1301, and 1302 have been collected, but are after the time zones in which the cumulative operation counts 1300, 1301 and 1302 have been collected. From these, there are nine possible combinations of (temporary ID 1320, temporary ID 1323), (temporary ID 1320, temporary ID 1324), (temporary ID 1320, temporary ID 1325), (temporary ID 1321, temporary ID 1323), (temporary ID 1321, temporary ID 1324), (temporary ID 1321, temporary ID 1325), (temporary ID 1322, temporary ID 1323), (temporary ID 1322, temporary ID 1324), and (temporary ID 1322, temporary ID 1325).

A cumulative operation count has a property of monotonously increasing as time passes. Among the nine combinations described above, there are six combinations of (temporary ID 1320, temporary ID 1323), (temporary ID 1321, temporary ID 1324), (temporary ID 1321, temporary ID 1323), (temporary ID 1322, temporary ID 1323), (temporary ID 1322, temporary ID 1324), and (temporary ID 1322, temporary ID 1325) that conform to the property.

However, in considering a condition that only the temporary ID 1323 can constitute a combination with the temporary ID 1320, and giving priority to a combination method that maximizes the number of combinations, remaining combinations are only (temporary ID 1320, temporary ID 1323), (temporary ID 1321, temporary ID 1324), and (temporary ID 1322, temporary ID 1325). Therefore, the estimation unit 1182 estimates that the cumulative operation counts 1300 and 1303 indicate a cumulative operation count of a same instrument, estimates that the temporary IDs 1320 and 1323 are assigned to a cumulative operation count of a same instrument, and sets the temporary IDs 1320 and 1323 as the old temporary ID 1115 and the new temporary ID 1114, respectively. Further, the estimation unit 1182 estimates that the cumulative operation counts 1301 and 1304 indicate a cumulative operation count of a same instrument, estimates that the temporary IDs 1321 and 1324 are assigned to a cumulative operation count of a same instrument, and sets the temporary IDs 1321 and 1324 as the old temporary ID 1115 and the new temporary ID 1114, respectively. Furthermore, the estimation unit 1182 estimates that the cumulative operation counts 1302 and 1305 indicate a cumulative operation count of a same instrument, estimates that the temporary IDs 1322 and 1325 are assigned to a cumulative operation count of a same instrument, and sets the temporary IDs 1322 and 1325 as the old temporary ID 1115 and the new temporary ID 1114, respectively.

1.7 Second Example of First Estimation Process

Figure 6:
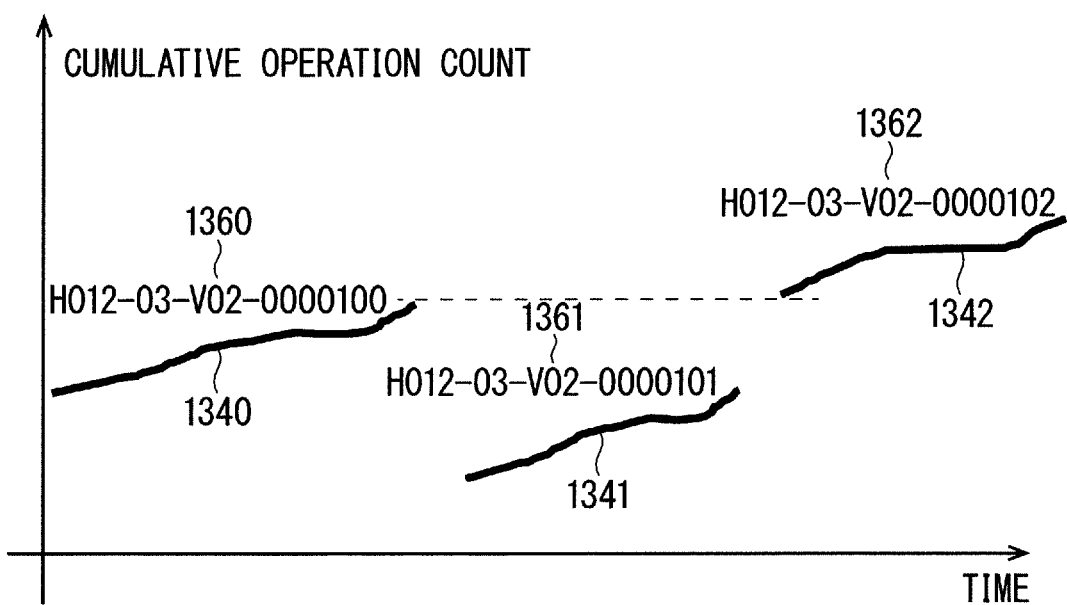
FIG. 6 is a graph illustrating a second example of a change with time of a cumulative operation count stored in the management DB provided in the system for managing railway vehicle instrument according to the first, second, and third embodiments.

FIG. 6 is a graph illustrating a second example of a change with time of a cumulative operation count stored in the management DB provided in the system for managing railway vehicle instrument according to the first embodiment.

The cumulative operation counts 1340, 1341, and 1342 stippled in FIG. 6 are respectively included in pieces of instrument information assigned with temporary IDs 1360, 1361, and 1362. The pieces of instrument information assigned with the temporary IDs 1360, 1361, and 1362 indicate an operation or a state of an instrument of a same type. FIG. 6 illustrates an example of a change in a case where an instrument mounted to a mounting position specified by "H012-03-V02" is removed from the mounting position due to a failure or the like, an instrument different from the instrument removed from the mounting position is mounted and operated in the mounting position, and then the instrument restored after being removed from the mounting position is mounted again to the mounting position.

Time zones in which the cumulative operation counts 1340, 1341, and 1342 have been collected are not overlapped with each other. The time zone in which the cumulative operation count 1341 has been collected is after the time zone in which the cumulative operation count 1340 has been collected. The time zone in which the cumulative operation count 1342 has been collected is after the time zones in which the cumulative operation counts 1340 and 1341 have been collected. From these, there are three possible combinations of (temporary ID 1360, temporary ID 1361), (temporary ID 1360, temporary ID 1362), and (temporary ID 1361, temporary ID 1362).

A cumulative operation count has a property of monotonously increasing as time passes. Among the above three combinations, there are two combinations of (temporary ID 1360, temporary ID 1362) and (temporary ID 1361, temporary ID 1362) that conform to the property.

The cumulative operation count collected first in the cumulative operation count 1342 is continuous from the cumulative operation count collected last in the cumulative operation count 1340. However, the cumulative operation count collected first in the cumulative operation count 1342 is not continuous from the cumulative operation count collected last in the cumulative operation count 1341. Therefore, the estimation unit 1182 estimates that the cumulative operation counts 1340 and 1342 indicate a cumulative operation count of a same instrument, estimates that the temporary IDs 1360 and 1362 are assigned to a cumulative operation count of a same instrument, and sets the temporary IDs 1360 and 1362 as the old temporary ID 1115 and the new temporary ID 1114, respectively.

1.8 Third Example of First Estimation Process

Figure 7:
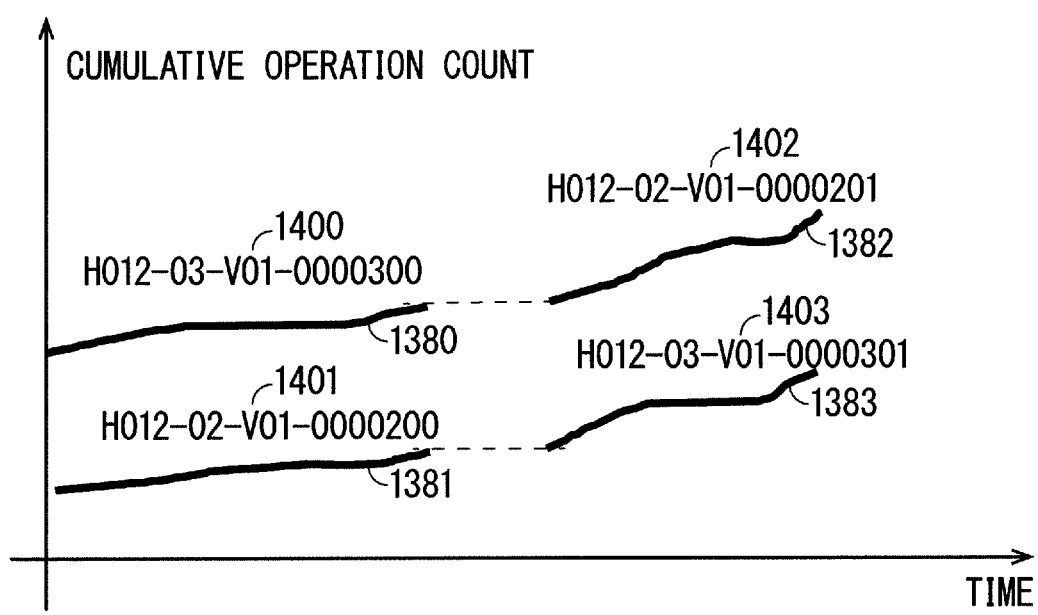
FIG. 7 is a graph illustrating a third example of a change with time of a cumulative operation count stored in the management DB provided in the system for managing railway vehicle instrument according to the first, second, and third embodiments.

FIG. 7 is a graph illustrating a third example of a change with time of a cumulative operation count stored in the management DB provided in the system for managing railway vehicle instrument according to the first embodiment.

Cumulative operation counts 1380, 1381, 1382, and 1383 stippled in FIG. 7 are respectively included in pieces of instrument information assigned with temporary IDs 1400, 1401, 1402, and 1403. The pieces of instrument information assigned with the temporary IDs 1400, 1401, 1402, and 1403 indicate an operation or a state of an instrument of a same type. FIG. 7 illustrates an example of change in a case where an instrument mounted to a mounting position indicated by "H012-02-V01" and an instrument mounted to a mounting position indicated by "H012-03-V01" are exchanged.

Time zones in which the cumulative operation counts 1380 and 1381 have been collected are overlapped with each other, and time zones in which the cumulative operation counts 1382 and 1383 have been collected are overlapped with each other. However, the time zones in which the cumulative operation counts 1382 and 1383 have been collected are not overlapped with the time zones in which the cumulative operation counts 1380 and 1381 have been collected, but are after the time zones in which the cumulative operation counts 1380 and 1381 have been collected. From these, there are four possible combinations of (temporary ID 1400, temporary ID 1402), (temporary ID 1400, temporary ID 1403), (temporary ID 1401, temporary ID 1402), and (temporary ID 1401, temporary ID 1403).

A cumulative operation count has a property of monotonously increasing as time passes. Among the above four combinations, there are three combinations of (temporary ID 1400, temporary ID 1402), (temporary ID 1401, temporary ID 1402), and (temporary ID 1401, temporary ID 1403) that conform to the property.

The cumulative operation count collected first in the cumulative operation count 1382 is continuous from the cumulative operation count collected last in the cumulative operation count 1380. Further, the cumulative operation count collected first in the cumulative operation count 1383 is continuous from the cumulative operation count collected last in the cumulative operation count 1381. Therefore, the estimation unit 1182 estimates that the cumulative operation counts 1380 and 1382 indicate a cumulative operation count of a same instrument, estimates that the temporary IDs 1400 and 1402 are assigned to a cumulative operation count of a same instrument, and sets the temporary IDs 1400 and 1402 as the old temporary ID 1115 and the new temporary ID 1114, respectively. Further, the estimation unit 1182 estimates that the cumulative operation counts 1381 and 1383 indicate a cumulative operation count of a same instrument, estimates that the temporary IDs 1401 and 1403 are assigned to a cumulative operation count of a same instrument, and sets the temporary IDs 1401 and 1403 as the old temporary ID 1115 and the new temporary ID 1114, respectively.

1.9 Second Estimation Process Using Setting Value Held by Instrument

The estimation process performed by the estimation unit 1182 may include a second estimation process using a setting value held by the instrument 1121 mounted to each mounting position 1120.

In a case where the second estimation process is performed, the instrument 1121 mounted to each mounting position 1120 holds a setting value even when power off/on of the vehicle 1122 having each mounting position 1120 is performed. In addition, the monitor apparatus 1141 further includes an update unit 1163.

When maintenance is started, the update unit 1163 reads a pre-start setting value to be taken by the setting value held by the instrument 1121, from the instrument 1121 mounted to each mounting position 1120, and writes a start-time setting value to the instrument 1121 after reading the pre-start setting value. By writing the start-time setting value to the instrument 1121, the setting value held by the instrument 1121 is to take the start-time setting value. The start-time setting value to be written is unique to each mounting position 1120, and indicates that an instrument holding the start-time setting value unique to each mounting position 1120 is mounted to each mounting position 1120 when maintenance is started. For example, the setting value held by the instrument 1121 is that obtained by converting the in-composition position information 1133 into a setting value, that obtained by converting the position information 1130 into a setting value, or the like. The start-time setting value written by the update unit 1163 to the instrument 1121 mounted to each mounting position 1120 is held even when power off/on of the vehicle 1122 having each mounting position 1120 is performed.

Further, when the maintenance is ended, the update unit 1163 reads an end-time setting value to be taken by the setting value held by the instrument 1121, from the instrument 1121 mounted to each mounting position 1120, and writes a pre-start setting value to the instrument 1121 after reading the end-time setting value. By writing the pre-start setting value to the instrument 1121, the setting value held by the instrument 1121 is to take the pre-start setting value again.

A method of setting the setting value held by the instrument 1121 mounted to each mounting position 1120 is determined for each type of the instrument 1121 mounted to each mounting position 1120.

However, the update unit 1163 does not perform the above-described reading and writing when the instrument 1121 mounted to each mounting position 1120 cannot hold the setting value.

The assignment unit 1161 determines whether or not replacement of the instrument 1121 mounted to each mounting position 1120 has been performed, in accordance with whether or not the end-time setting value read from the instrument 1121 mounted to each mounting position 1120 is the same as the start-time setting value read from the instrument 1121 mounted to each mounting position 1120. When the end-time setting value read from the instrument 1121 mounted to each mounting position 1120 is the same as the start-time setting value read from the instrument 1121 mounted to each mounting position 1120, the assignment unit 1161 determines that replacement of the instrument 1121 mounted to each mounting position 1120 has not been performed, and does not update the serial number 1131, even when power off/on of the vehicle 1122 having each mounting position 1120, execution of a test function of testing the instrument 1121 mounted to each mounting position 1120, or the like is performed. Whereas, when the end-time setting value read from the instrument 1121 mounted to each mounting position 1120 is different from the start-time setting value read from the instrument 1121 mounted to each mounting position 1120, the assignment unit 1161 determines that replacement of the instrument 1121 mounted to each mounting position 1120 has been performed, and updates the serial number 1131 determined for each mounting position 1120.

The communication unit 1142 transmits the written start-time setting value and the read end-time setting value to the ground apparatus 1021. The communication unit 1180 receives the written start-time setting value and the read end-time setting value from the on-board apparatus 1020.

In the second estimation process, in a case where the end-time setting value read from a first instrument mounted to a first mounting position of a first composition included in the at least one composition when the maintenance is ended, is same as the start-time setting value written to a second instrument mounted to a second mounting position of a second composition included in the at least one composition when maintenance is started, it is estimated that a mounting destination of the second instrument has been changed from the second mounting position to the first mounting position in the maintenance. The first composition may be the same as the second composition or may be different from the second composition. In addition, a first temporary ID assigned to first instrument information indicating an operation or a state of the first instrument mounted to the first mounting position after maintenance is ended, and a second temporary ID assigned to the second instrument information indicating an operation or a state of the second instrument mounted to the second mounting position before the maintenance is started, are respectively set as the new temporary ID 1114 and the old temporary ID 1115.

The start and end of maintenance are instructed by an operation of a maintenance worker on the monitor apparatus 1141. Therefore, by the update unit 1163 detecting the operation of the maintenance worker on the monitor apparatus 1141, the time when the maintenance is started and when the maintenance is ended are recognized by the update unit 1163. At least one of the time when the maintenance is started and when the maintenance is ended may be recognized by the update unit 1163, by other than the update unit 1163 detecting the operation of the maintenance worker on the monitor apparatus 1141. For example, the time when the maintenance is ended may be recognized by the update unit 1163, by the update unit 1163 detecting that the execution unit 1162 has executed the test function when the maintenance is ended.

In a case of only identifying each mounting position 1120 in each composition 1040, such as one in which the start-time setting value is obtained by converting the in-composition position information 1133 into the setting value, a change of the mounting position from one mounting position of each composition 1040 to another mounting position of each composition 1040 is estimated exclusively. However, in a case of identifying each mounting position 1120 in a plurality of compositions, such as one in which the start-time setting value is obtained by converting the composition number 1132 and the in-composition position information 1133 into the setting value, a change of the mounting destination across compositions from one mounting position of one composition included in the plurality of compositions to another mounting position of another composition included in the plurality of compositions is also estimated, in addition to the estimation of the change in the mounting destination from one mounting position of each composition 1040 to another mounting position of each composition 1040. For example, in a case where the start-time setting value is obtained by converting the composition number 1132 and the consecutive number 1136 specifying which of the plurality of mounting positions each mounting position 1120 is, a change of the mounting destination from one mounting position of one composition included in the plurality of compositions to another mounting position of another composition included in the plurality of compositions is also estimated.

When the assignment unit 1161 determines that replacement of the instrument 1121 mounted to each mounting position 1120 has been performed, it is also permitted that the assignment unit 1161 determines information indicating that the new temporary ID 1114 and the old temporary ID 1115 are associated with each other, the communication unit 1142 transmits the information to the ground apparatus 1021, the communication unit 1180 receives the information from the on-board apparatus 1020, and the association DB 1183 adds, to the entry group 1117, the entry 1116 indicating that the new temporary ID 1114 and the old temporary ID 1115 indicated by the information are associated with each other. As a result, the assignment unit 1161 functions as an estimation unit that estimates a combination of the new temporary ID 1114 and the old temporary ID 1115 instead of the estimation unit 1182, and the estimation unit 1182 no longer needs to perform the estimation process.

According to the second estimation process, a change of the mounting position mounted with the instrument is estimated more accurately on the basis of the start-time setting value and the end-time setting value.

1.10 Example of Second Estimation Process

FIGS. 8A to 8E are views illustrating an example of setting of a set temperature of an air conditioner by an update unit provided in the system for managing railway vehicle instrument according to the first embodiment.

In the example illustrated in FIGS. 8A to 8E, an air conditioner is equipped to each vehicle of a first car 1420, which is a first vehicle, a second car 1421, which is a second vehicle, and a third car 1422, which is a third vehicle. The air conditioner is mounted to a mounting position of a vehicle equipped with the air conditioner. The air conditioner maintains a set temperature, which is a setting value of a temperature, even when power off/on of the vehicle equipped with the air conditioner is performed. The set temperature of the air conditioner is set by the update unit 1163 writing the set temperature in the air conditioner.

Figure 8:
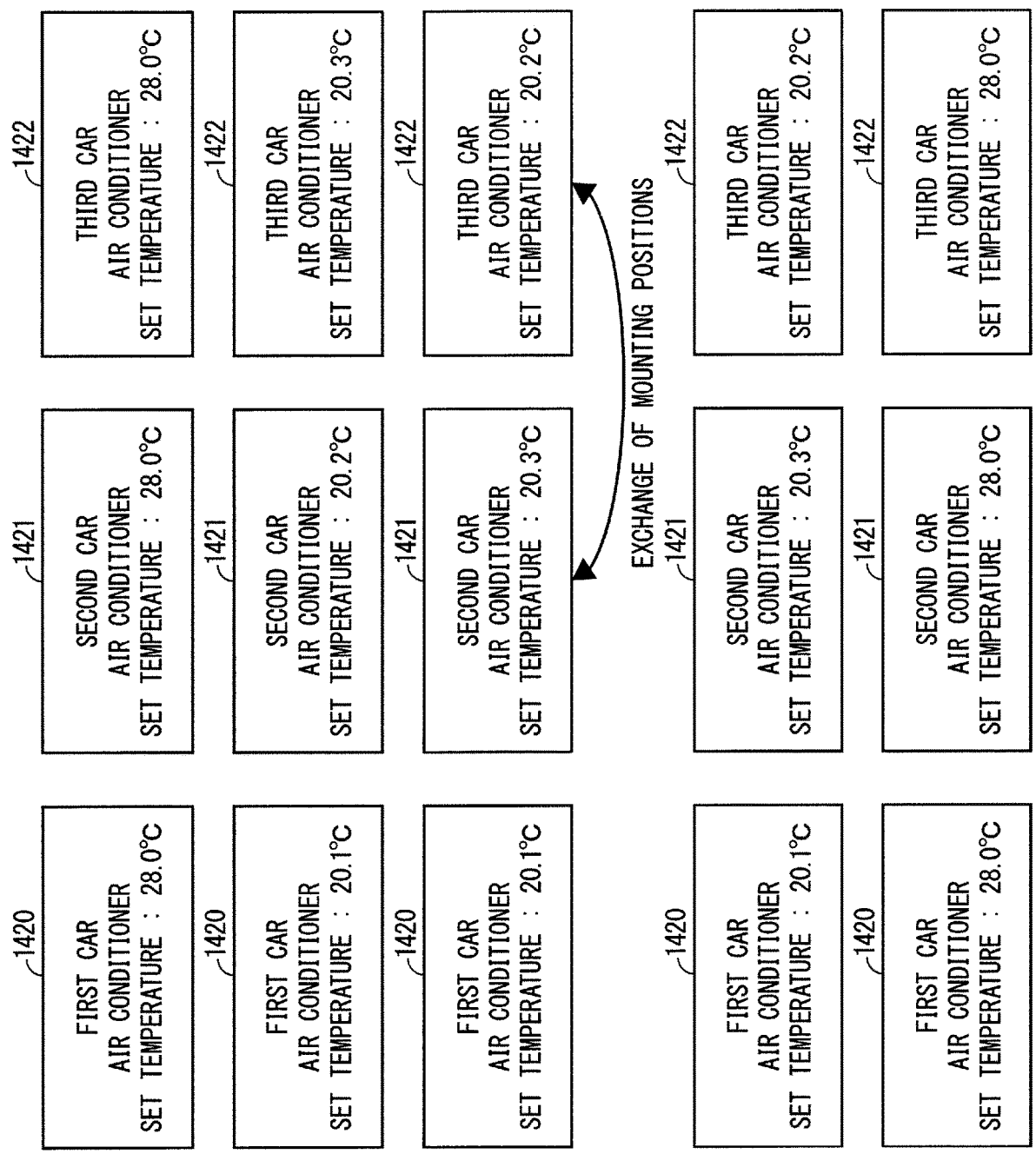
FIGS. 8A to 8E are views illustrating an example of setting of a set temperature of an air conditioner by an update unit provided in the system for managing railway vehicle instrument according to the first, second, and third embodiments.

Before maintenance is started, as illustrated in FIG. 8A, set temperatures of the air conditioners equipped to the first car 1420, the second car 1421, and the third car 1422 are all 28.0° C.

When the maintenance is started, the update unit 1163 respectively reads and stores pre-start set temperatures 28.0° C., 28.0° C., and 28.0° C., from the air conditioners equipped to the first car 1420, the second car 1421, and the third car 1422.

In addition, when the maintenance is started, the update unit 1163 respectively writes start-time set temperatures of 20.1° C., 20.2° C., and 20.2° C., in the air conditioners equipped to the first car 1420, the second car 1421, and the third car 1422. As a result, as illustrated in FIG. 8B, the set temperatures of the air conditioners equipped to the first car 1420, the second car 1421, and the third car 1422 respectively become 20.1° C., 20.2° C., and 20.3° C. The start-time set temperatures 20.1° C., 20.2° C., and 20.3° C. are different from one another, and are temperatures individually unique to the mounting positions of the first car 1420, the second car 1421, and the third car 1422.

During the maintenance, replacement of the mounting positions of the air conditioners equipped to the second car 1421 and the third car 1422 is performed as follows: the air conditioner mounted to the mounting position of the second car 1421 is mounted to the mounting position of the third car 1422. Further, the air conditioner mounted to the mounting position of the third car 1422 is mounted to the mounting position of the second car 1421.

As a result, as illustrated in FIG. 8C, the set temperature of the air conditioner equipped to the first car 1420 is maintained at 20.1° C., the set temperature of the air conditioner equipped to the second car 1421 is changed from 20.2° C. to 20.3° C., and the set temperature of the air conditioner equipped to the third car 1422 is changed from 20.3° C. to 20.2° C.

When the maintenance is ended, as illustrated in FIG. 8D, the set temperatures of the air conditioners equipped to the first car 1420, the second car 1421, and the third car 1422 have respectively become 20.1° C., 20.3° C., and 20.2° C.

When the maintenance is ended, the update unit 1163 reads end-time set temperatures 20.1° C., 20.3° C., and 20.2° C., from the air conditioners equipped to the first car 1420, the second car 1421, and the third car 1422, respectively. In addition, since the end-time set temperature 20.3° C. of the air conditioner equipped to the second car 1421 is the same as the start-time set temperature 20.3° C. of the air conditioner equipped to the third car 1422, the estimation unit 1182 estimates that a mounting destination of the air conditioner equipped to the third car 1422 has been changed from the mounting position of the third car 1422 to the mounting position of the second car 1421. Furthermore, since the end-time set temperature 20.2° C. of the air conditioner equipped to the third car 1422 is the same as the start-time set temperature 20.2° C. of the air conditioner equipped to the second car 1421, the estimation unit 1182 estimates that a mounting destination of the air conditioner equipped to the second car 1421 has been changed from the mounting position of the second car 1421 to the mounting position of the third car 1422.

Further, when the maintenance is ended, the update unit 1163 writes pre-start set temperatures 28.0° C., 28.0° C., and 28.0° C. to the air conditioners equipped to the first car 1420, the second car 1421, and the third car 1422, respectively. As a result, as illustrated in FIG. 8E, the set temperatures of the air conditioners equipped to the first car 1420, the second car 1421, and the third car 1422 respectively become 28.0° C., 28.0° C., and 28.0° C.

1.11 Reduction of Communication Amount Between On-Board Apparatus and Ground Apparatus In the assignment of the temporary ID 1111 above, the temporary ID 1111 is assigned to the collected instrument information 1110 by the on-board apparatus 1020 each time the instrument information 1110 has been collected. However, the temporary ID 1111 to be assigned to the instrument 1121 mounted to each mounting position 1120 may be transmitted from the on-board apparatus 1020 to the ground apparatus 1021 each time the vehicle 1122 having each mounting position 1120 is activated, and the temporary ID 1111 already transmitted to the instrument information 1110 collected from the instrument 1121 mounted to each mounting position 1120 may be assigned by the ground apparatus 1021 after the vehicle 1122 having each mounting position 1120 is activated. This reduces a communication amount between the on-board apparatus 1020 and the ground apparatus 1021.

2. Second Embodiment

A second embodiment relates to a system for managing railway vehicle instrument replacing the system for managing a railway vehicle of the first embodiment.

A main difference between the first embodiment and the second embodiment is that, while the assignment unit 1161 provided in the on-board apparatus 1020 assigns the temporary ID 1111 to the instrument information 1110 in the first embodiment, necessary information required for assigning a temporary ID 1111 to instrument information 1110 is transmitted from an on-board apparatus to a ground apparatus, and an assignment unit provided in the ground apparatus assigns the temporary ID 1111 to the instrument information 1110, in the second embodiment.

Within a range where adopting the configuration causing the above main differences is not inhibited, a configuration adopted in other embodiments may be adopted in the second embodiment.

Figure 9:
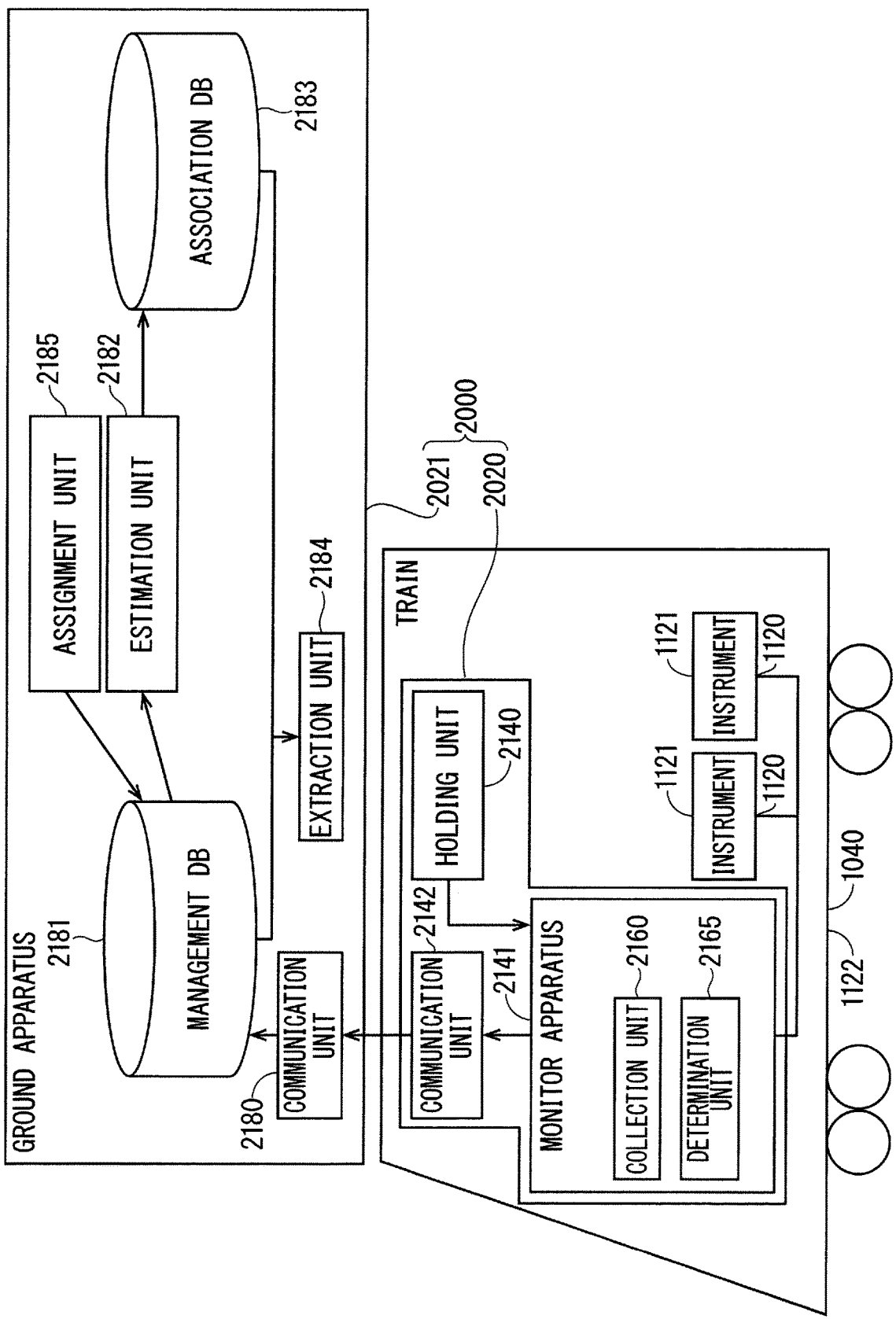
FIG. 9 is a block diagram illustrating a system for managing railway vehicle instrument according to the second embodiment.
Figure 10:
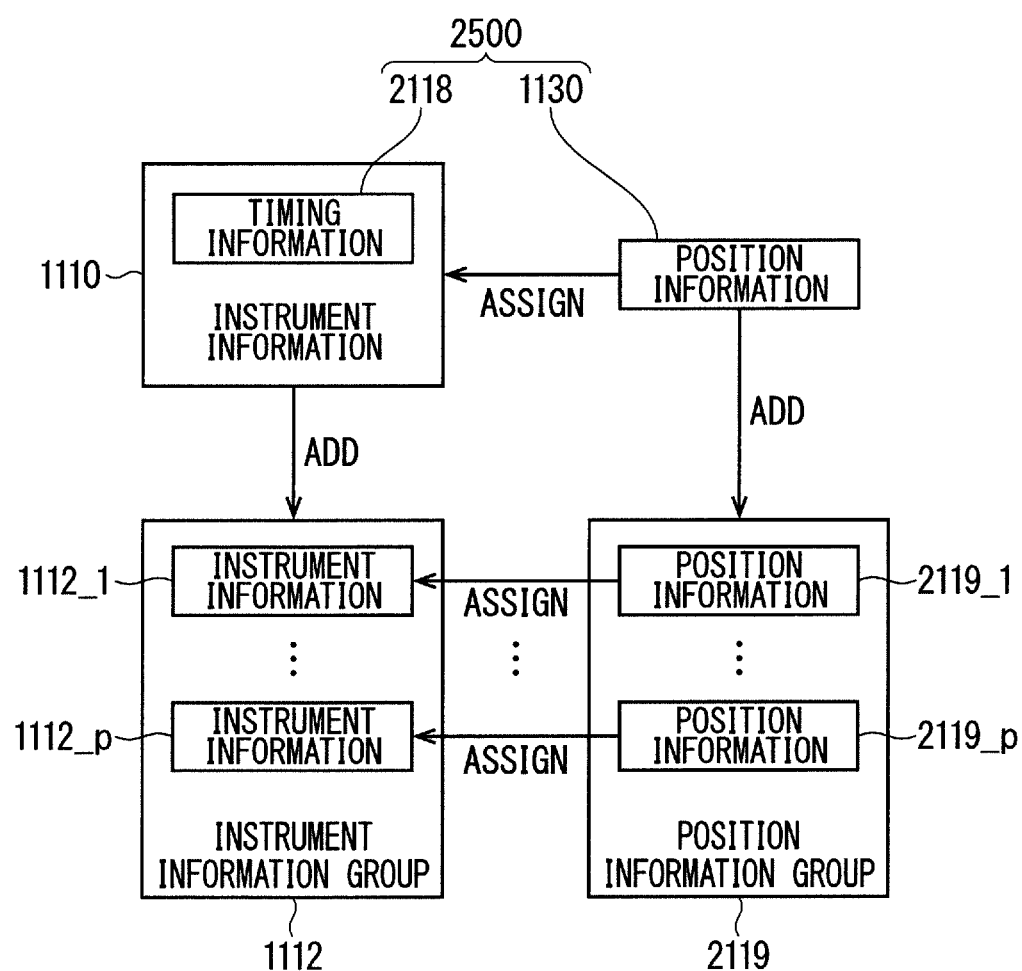
FIG. 10 is a diagram illustrating a flow of information processing in the system for managing railway vehicle instrument according to the second embodiment.

FIG. 2 is also a diagram illustrating a flow of information processing handled in the system for managing railway vehicle instrument according to the second embodiment. FIG. 3 is also a diagram illustrating a data structure of a temporary ID handled in the system for managing railway vehicle instrument according to the second embodiment. FIG. 4 is also a view illustrating an example of a table stored in an association database (association DB) provided in the system for managing railway vehicle instrument according to the second embodiment. FIGS. 5, 6, and 7 are also graphs respectively illustrating a first, second, and third examples of a change with time of a cumulative operation count stored in a management DB provided in the system for managing railway vehicle instrument of the second embodiment. FIGS. 8A to 8E are also views illustrating an example of setting of a set temperature of an air conditioner by an update unit provided in the system for managing railway vehicle instrument according to the second embodiment. FIG. 9 is a block diagram illustrating the system for managing railway vehicle instrument according to the second embodiment. FIG. 10 is a diagram illustrating a flow of information processing in the system for managing railway vehicle instrument according to the second embodiment. The information processing illustrated in FIG. 10 is performed in the system for managing railway vehicle instrument of the second embodiment, in addition to the information processing illustrated in FIG. 2.

A system 2000 for managing railway vehicle instrument illustrated in FIG. 9 includes an on-board apparatus 2020 and a ground apparatus 2021 for managing railway vehicle instrument.

In the system 2000, the on-board apparatus 2020 transmits instrument information 1110 to the ground apparatus 2021. In the transmitted instrument information 1110, as illustrated in FIG. 10, timing information 2118 to be used to specify a timing when replacement of instrument 1121 mounted to each mounting position 1120 is possibly performed is recorded. The ground apparatus 2021 adds the received instrument information 1110 to a stored instrument information group 1112.

Further, in the system 2000, the on-board apparatus 2020 assigns position information 1130 to the instrument information 1110 to be transmitted. The ground apparatus 2021 adds the position information 1130 assigned to the received instrument information 1110, to a stored position information group 2119.

Furthermore, in the system 2000, as illustrated in FIG. 2, the ground apparatus 2021 assigns a temporary ID 1111 to the instrument information 1110, and adds the assigned temporary ID 1111 to a stored temporary ID group 1113.

In addition, in the system 2000, as illustrated in FIG. 2, the ground apparatus 2021 estimates a combination of a new temporary ID 1114 and an old temporary ID 1115 included in the stored temporary ID group 1113 and respectively assigned to new instrument information and old instrument information that indicate an operation or a state of a same instrument.

As illustrated in FIG. 9, the on-board apparatus 2020 includes a holding unit 2140, a monitor apparatus 2141, and a communication unit 2142. The monitor apparatus 2141 includes a collection unit 2160 and a determination unit 2165.

The holding unit 2140 holds a composition number 1132.

The collection unit 2160 collects the instrument information 1110 indicating an operation or a state of the instrument 1121 mounted to each mounting position 1120.

The determination unit 2165 acquires the composition number 1132 from the holding unit 2140, determines in-composition position information 1133, and sets the position information 1130 including the acquired composition number 1132 and the determined in-composition position information 1133 in the collected instrument information 1110. Further, the determination unit 2165 determines the timing information 2118, and records the determined timing information 2118 in the collected instrument information 1110. As a result, in the ground apparatus 2021, the determination unit 2165 determines necessary information 2500 required for assigning, to the instrument information 1110, the temporary ID 1111 including the position information 1130 that includes the composition number 1132 and the in-composition position information 1133 and further including a serial number 1131.

In a case where the timing when the serial number 1131 is updated is when power off/on of the vehicle 1122 having each mounting position 1120 is performed, the timing information 2118 to be determined is information indicating that the monitor apparatus 2141 has been activated, and the like. In a case where the timing when the serial number 1131 is updated is when a test function of testing the instrument 1121 mounted to each mounting position 1120 is executed, the timing information 2118 to be determined is the time when a test function is executed, and the like.

The communication unit 2142 transmits the collected instrument information 1110 and the position information 1130 that is set in the collected instrument information 1110, to the ground apparatus 2021. As a result, the collected instrument information 1110 and the determined necessary information 2500 are transmitted to the ground apparatus 2021. The necessary information 2500 is composed of the timing information 2118 recorded in the collected instrument information 1110, and the position information 1130 that is set in the collected instrument information 1110.

The ground apparatus 2021 includes a communication unit 2180, a management database (management DB) 2181, an estimation unit 2182, an association database (association DB) 2183, an extraction unit 2184, and an assignment unit 2185.

The communication unit 2180 receives, from the on-board apparatus 2020, the instrument information 1110 and the position information 1130 that is set in the instrument information 1110. As a result, the collected instrument information 1110 and the determined necessary information 2500 are received from the on-board apparatus 2020.

The management DB 2181 stores the instrument information group 1112, the temporary ID group 1113, and the position information group 2119. p pieces of temporary IDs 1113_1 to 1113_p included in the stored temporary ID group 1113 are respectively assigned to p pieces of instrument information 1112_1 to 1112_p included in the stored instrument information group 1112. p pieces of position information 2119_1 to 2119_p included in the stored position information group 2119 are respectively assigned to the pieces of instrument information 1112_1 to 1112_p included in the stored instrument information group 1112.

Further, the management DB 2181 adds the received instrument information 1110 to the stored instrument information group 1112, adds the temporary ID 1111 assigned to the received instrument information 1110 to the stored temporary ID group 1113, and adds the position information 1130 that is set in the received instrument information 1110 to the stored position information group 2119.

The assignment unit 2185 assigns the temporary ID 1111 to the instrument information 1110 by using the received necessary information 2500. The position information 1130 included in the temporary ID 1111 is obtained from the position information 1130 assigned to the instrument information 1110. The serial number 1131 included in the temporary ID 1111 is updated at a timing when replacement of the instrument 1121 mounted to each mounting position 1120 is possibly performed, which is specified by the timing information 2118 included in the received necessary information 2500.

The estimation unit 2182, the association DB 2183, and the extraction unit 2184 operate similarly to the estimation unit 1182, the association DB 1183, and the extraction unit 1184 provided in the system 1000 of the first embodiment, respectively.

According to the system 2000 of the second embodiment, similarly to the system 1000 of the first embodiment, even in a case where replacement of an instrument 1121 mounted to each mounting position 1120 is performed, the mounting position mounted with the instrument 1121 can be tracked, the instrument information 1110 indicating an operation or a state of the instrument 1121 can be tracked, and an accurate history of the instrument information 1110 can be obtained. Further, it is not necessary to construct a mechanism to identify the instrument 1121 itself in order to obtain an accurate history of the instrument information 1110.

Further, according to the system 2000 of the second embodiment, it becomes possible to track the instrument information 1110 by simply making a change in the ground apparatus 2021 installed on the ground without making a change to the monitor apparatus 2141 and the instrument 1121 equipped to each composition 1040 used for operation. Therefore, the system 2000 for tracking the instrument information 1110 is realized even in a case where the monitor apparatus 2141 and the instrument 1121 equipped to each composition 1040 used for operation cannot be changed. For example, even in a case where it is not permitted to disable the use of each composition 1040 for operation, and it is not possible to perform work of making a change in the monitor apparatus 2141 and the instrument 1121, the system 2000 for tracking the instrument information 1110 is realized.

Further, according to the system 2000 of the second embodiment, by simply updating software installed in the ground apparatus 2021 installed on the ground without updating software installed in each composition 1040 used for operation, tracking of the instrument information 1110 becomes possible. This reduces an amount of work required to update the software.

3. Third Embodiment

A third embodiment relates to a system for managing railway vehicle instrument replacing the system for managing a railway vehicle of the first embodiment.

In the third embodiment, in addition to performing processing similar to the processing performed in the second embodiment, in a case where there are a plurality of candidates that can be a combination of a new temporary ID 1114 and an old temporary ID 1115, a correction process is performed to set a combination selected from the plurality of candidates.

Within a range where adopting the configuration enabling the correction process above is not inhibited, a configuration adopted in other embodiments may be adopted in the third embodiment.

Figure 11:
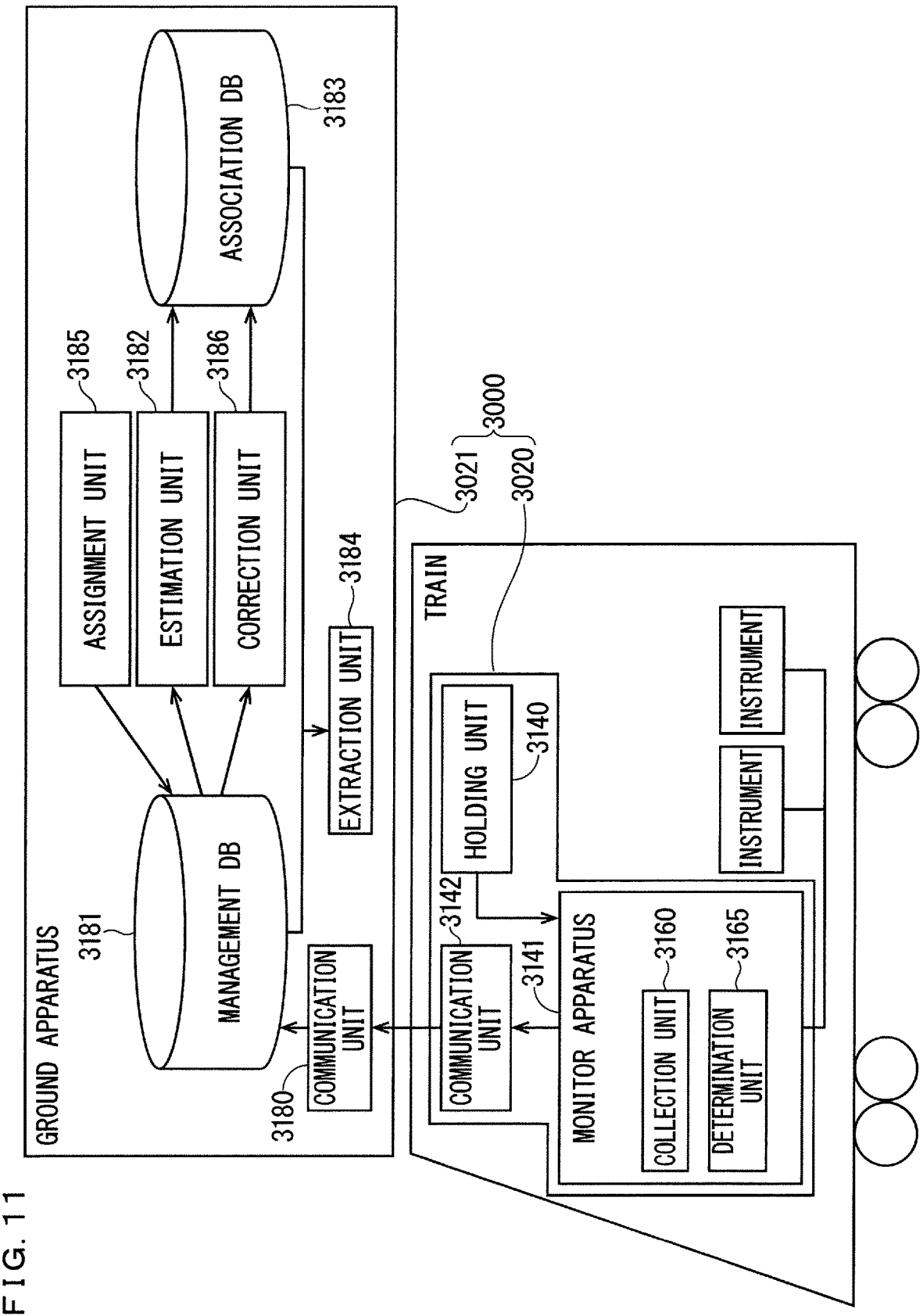
FIG. 11 is a block diagram illustrating a system for managing railway vehicle instrument according to the third embodiment.

FIG. 2 is also a diagram illustrating a flow of information processing handled in the system for managing railway vehicle instrument according to the third embodiment. FIG. 3 is also a diagram illustrating a data structure of a temporary ID handled in the system for managing railway vehicle instrument according to the third embodiment. FIG. 4 is also a view illustrating an example of a table stored in an association database (association DB) provided in the system for managing railway vehicle instrument according to the third embodiment. FIGS. 5, 6, and 7 are also graphs respectively illustrating a first, second, and third examples of a change with time of a cumulative operation count stored in a management DB provided in the system for managing railway vehicle instrument of the third embodiment. FIGS. 8A to 8E are also a view illustrating an example of setting of a set temperature of an air conditioner by an update unit provided in the system for managing railway vehicle instrument according to the third embodiment. FIG. 11 is a block diagram illustrating the system for managing railway vehicle instrument according to the third embodiment.

A system 3000 for managing railway vehicle instrument illustrated in FIG. 11 includes an on-board apparatus 3020 and a ground apparatus 3021 for managing railway vehicle instrument. The on-board apparatus 3020 includes a holding unit 3140, a monitor apparatus 3141, and a communication unit 3142. The monitor apparatus 3141 includes a collection unit 3160 and a determination unit 3165. The ground apparatus 3021 includes a communication unit 3180, a management database (management DB) 3181, an estimation unit 3182, an association database (association DB) 3183, an extraction unit 3184, an assignment unit 3185, and a correction unit 3186.

Constituent components other than the correction unit 3186 provided in the system 3000 of the third embodiment may operate similarly to the constituent components of the same name provided in the system 2000 of the second embodiment.

In a case where a plurality of candidates that can be the combination of the new temporary ID 1114 and the old temporary ID 1115 remain in a first estimation process, the correction unit 3186 acquires the plurality of remaining candidates from the estimation unit 3182, presents the plurality of acquired candidates to an administrator of the ground apparatus 3021, and sets a candidate selected by the administrator from the plurality of presented candidates as the combination. Further, an entry 1116 indicating that the new temporary ID 1114 and the old temporary ID 1115 constituting the combination are associated with each other is added to an entry group 1117 stored in the association DB 3183. The administrator selects a candidate that matches a work history at a time of maintenance, from the plurality of candidates. As a result, correspondence information indicating that the new temporary ID 1114 and the old temporary ID 1115 correspond each other is corrected on the basis of the work history at the time of maintenance.

According to system 3000 of the third embodiment, similarly to the system 1000 of the first embodiment, even in a case where replacement of an instrument 1120 mounted to each mounting position 1120 is performed, the mounting position mounted with the instrument 1120 can be tracked, the instrument information 1110 indicating an operation or a state of the instrument 1120 can be tracked, and an accurate history of the instrument information 1110 can be obtained. Further, it is not necessary to construct a mechanism to identify the instrument 1120 itself in order to obtain an accurate history of the instrument information 1110.

Further, according to the system 3000 of the third embodiment, even in a case where there are a plurality of candidates that can be the combination of the new temporary ID 1114 and the old temporary ID 1115, means is provided for the administrator to correct the combination, the association between the new temporary ID 1114 and the old temporary ID 1115 is more accurately managed from the work history at the time of maintenance, and a more accurate history of the instrument information 1110 can be obtained.

Figure 12:
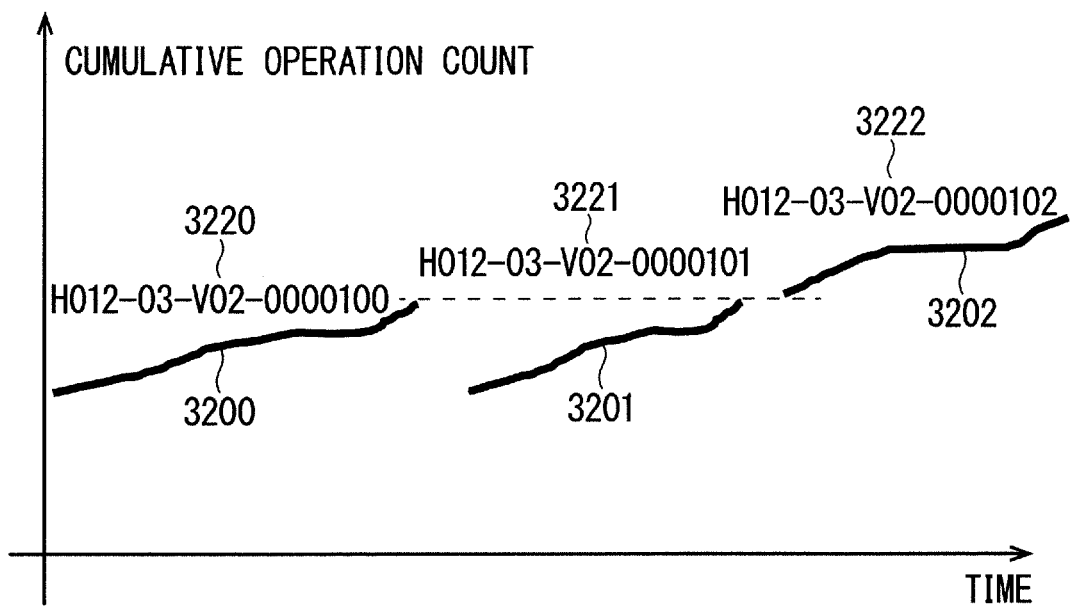
FIG. 12 is a graph illustrating a fourth example of a change with time of a cumulative operation count stored in a management DB provided in the system for managing railway vehicle instrument according to the third embodiment.

FIG. 12 is a graph illustrating a fourth example of a change with time of a cumulative operation count stored in the management DB provided in the system for managing railway vehicle instrument according to the third embodiment.

Cumulative operation counts 3200, 3201, and 3202 stippled in FIG. 12 are respectively included in pieces of instrument information assigned with temporary IDs 3220, 3221, and 3222. The pieces of instrument information assigned with the temporary IDs 3220, 3221, and 3222 indicate an operation or a state of an instrument of a same type. FIG. 12 illustrates an example of a change in a case where an instrument mounted to a mounting position indicated by "H012-03-V02" is removed from the mounting position due to a failure or the like, an instrument different from the instrument removed from the mounting position is mounted and operated in the mounting position, and then the instrument restored after being removed from the mounting position is mounted again to the mounting position.

Time zones in which cumulative operation counts 3200, 3201, and 3202 have been collected are not overlapped with each other. The time zone in which the cumulative operation count 3201 has been collected is after the time zone in which the cumulative operation count 3200 has been collected. The time zone in which the cumulative operation count 3202 has been collected is after the time zones in which the cumulative operation counts 3200 and 3201 are collected. From these, there are three possible combinations of (temporary ID 3220, temporary ID 3221), (temporary ID 3220, temporary ID 3222), and (temporary ID 3221, temporary ID 3222).

A cumulative operation count has a property of monotonously increasing as time passes. Among the above three combination candidates, there are two combinations (temporary ID 3220, temporary ID 3222) and (temporary ID 3221, temporary ID 3222) that conform to the property.

The cumulative operation count collected first in the cumulative operation count 3202 is continuous from the cumulative operation count collected last in the cumulative operation count 3200. Further, the cumulative operation count collected first in the cumulative operation count 3202 is also continuous from the cumulative operation count collected last in the cumulative operation count 3201.

Therefore, in the first estimation process, two combination candidates of (temporary ID 3220, temporary ID 3222) and (temporary ID 3221, temporary ID 3222) remain. In such a case, correction is performed by the correction unit 3186, and selection is made from two combination candidates of (temporary ID 3220, temporary ID 3222) and (temporary ID 3221, temporary ID 3222).

4. Fourth Embodiment

A fourth embodiment relates to a system for managing railway vehicle instrument replacing the system for managing a railway vehicle of the first embodiment.

In the fourth embodiment, in addition to performing processing similar to the processing performed in the third embodiment, in a case where there are a plurality of candidates that can be a combination of a new temporary ID 1114 and an old temporary ID 1115, a correction process is performed on the basis of a work time recorded in a work record to set a combination selected from the plurality of candidates.

Within a range where adopting the configuration enabling the correction process above is not inhibited, a configuration adopted in other embodiments may be adopted in the fourth embodiment.

Figure 13:
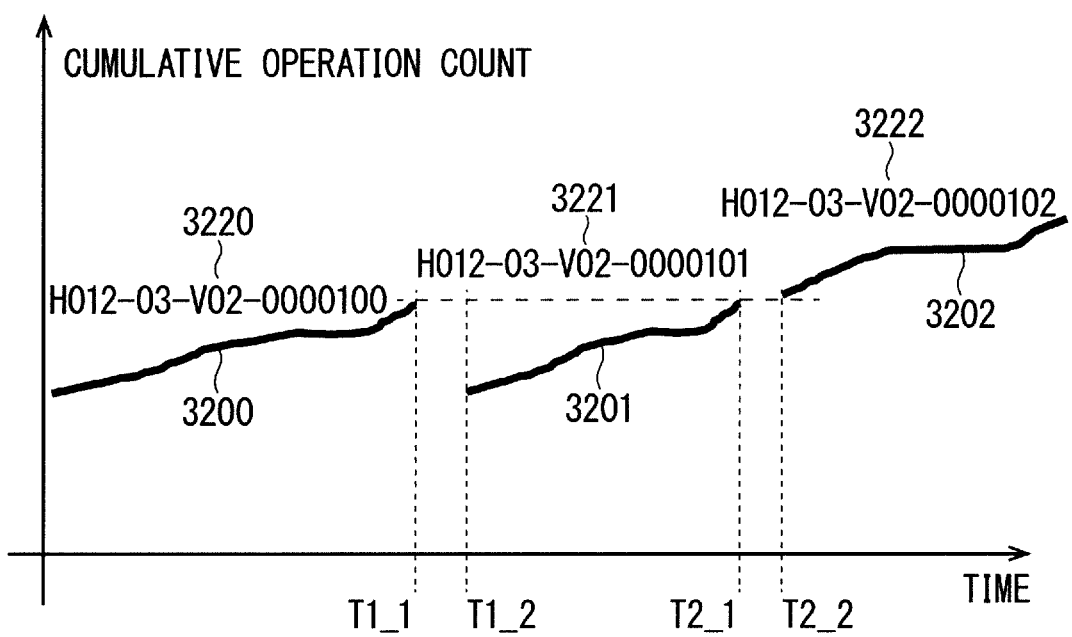
FIG. 13 is a graph illustrating a fifth example of a change with time of a cumulative operation count stored in a management DB provided in a system for managing railway vehicle instrument according to a fourth embodiment.

FIG. 13 is a graph illustrating a fifth example of a change with time of a cumulative operation count stored in a management DB provided in the system for managing railway vehicle instrument according to the fourth embodiment. FIG. 13 is obtained by adding a time of each operation record into FIG. 12 in order to explain the correction process, and reference numerals regarding a temporary ID, an operation count, and the like in the figure are the same as those in FIG. 12.

A recording time of a last operation count of a temporary ID 3220 is defined as T1_1, a recording time of a first operation count of a temporary ID 3221 is defined as T1_2, a recording time of a last operation count of a temporary ID 3221 is defined as T2_1, and a recording time of a first operation count of a temporary ID 3222 is defined as T2_2.

Time zones in which cumulative operation counts 3200, 3201, and 3202 have been collected are not overlapped with each other. The time zone in which the cumulative operation count 3201 has been collected is after the time zone in which the cumulative operation count 3200 has been collected. The time zone in which the cumulative operation count 3202 has been collected is after the time zones in which the cumulative operation counts 3200 and 3201 are collected. From these, there are three possible combinations of (temporary ID 3220, temporary ID 3221), (temporary ID 3220, temporary ID 3222), and (temporary ID 3221, temporary ID 3222).

A cumulative operation count has a property of monotonously increasing as time passes. Among the above three combination candidates, there are two combinations (temporary ID 3220, temporary ID 3222) and (temporary ID 3221, temporary ID 3222) that conform to the property.

The cumulative operation count collected first in the cumulative operation count 3202 is continuous from the cumulative operation count collected last in the cumulative operation count 3200. Further, the cumulative operation count collected first in the cumulative operation count 3202 is also continuous from the cumulative operation count collected last in the cumulative operation count 3201.

Therefore, in the first estimation process, two combination candidates of (temporary ID 3220, temporary ID 3222) and (temporary ID 3221, temporary ID 3222) remain.

Further, when a replacement time of the instrument at a position corresponding to H012-03-V02 is recorded as the work record, it is possible to use for estimation of association of the temporary ID on the basis of this.

For example, consider a case where replacement of the instrument at the position corresponding to H012-03-V02 has been performed once, and a time of the work record is T and $T2\_1<T<T2\_2$. In this case, since the temporary ID 3221 and the temporary ID 3222 have been exchanged between the times $T2\_1$ and $T2\_2$, it can be seen that they are not the same instrument. Therefore, among the two candidates remaining in the estimation process above, only the combination of (temporary ID 3220, temporary ID 3222) remains since the combination of (temporary ID 3221, temporary ID 3222) does not match this condition.

In this manner, by performing correction with the correction unit 3186, making selection from the two combination candidates (temporary ID 3220, temporary ID 3222) and (temporary ID 3221, temporary ID 3222), and performing the estimation process on the basis of information of the work record, it is possible to select only the combination of (temporary ID 3221, temporary ID 3222).

It should be noted that the present invention can freely combine each embodiment within the scope of the invention, and can deform or omit each embodiment as appropriate.

While the present invention has been described in detail, the foregoing description is in all aspects illustrative and the present invention is not limited thereto. It is understood that innumerable modifications not illustrated can be envisaged without departing from the scope of the present invention.

EXPLANATION OF REFERENCE SIGNS

1000, 2000, 3000: system for managing railway vehicle instrument
1020, 2020, 3020: on-board apparatus
1021, 2021, 3021: ground apparatus
1040: each composition
1100, 1101: mounting position
1120: each mounting position
1140, 2140, 3140: holding unit
1141, 2141, 3141: monitor apparatus
1142, 1180, 2142, 2180, 3142, 3180: communication unit
1160, 2160, 3160: collection unit
1161, 2185, 3185: assignment unit
1162: execution unit
1163: update unit
1181, 2181, 3181: management database (management DB)
1182, 2182, 3182: estimation unit
1183, 2183, 3183: association database (association DB)
1184, 2184, 3184: extraction unit
2165, 3165: determination unit
3186: correction unit

The invention claimed is:

1. A system for managing a railway vehicle instrument, the system comprising: an on-board computer coupled to a train, the on-board computer configured to: collect instrument information indicating an operation or a state of each railway vehicle instrument respectively mounted to each mounting position that is each of at least one mounting position included in a composition of the train; and update a to-be-updated identifier determined for each mounting position, and assign, to the instrument information, a temporary identifier including position information specifying each mounting position and the to-be-updated identifier; and a ground computer physically separate from the train, the ground computer configured to: store, via a database, an instrument information group and a temporary identifier group, wherein temporary identifiers of the temporary identifier group are assigned to instrument information of the instrument information group; and perform an estimation process of estimating a combination of temporary identifiers included in the temporary identifier group and assigned to pieces of instrument information indicating the operation or the state of the railway vehicle instrument, wherein the railway vehicle instrument is not a generic computer, wherein the composition of the train includes a vehicle having each mounting position, the railway vehicle instrument mounted to a mounting position holds a setting value even in a case where off/on of power of the vehicle is performed, the on-board computer is configured to: (1) read a pre-start setting value to be taken by the setting value, from the railway vehicle instrument mounted to the mounting position when maintenance is started, write a start-time setting value unique to the mounting position to the railway vehicle instrument mounted to the mounting position after reading the pre-start setting value, and cause the setting value to take the start-time setting value, and to (2) read an end-time setting value to be taken by the setting value, from the railway vehicle instrument mounted to the mounting position when the maintenance is ended, write the pre-start setting value to the railway vehicle instrument mounted to the mounting position after reading the end-time setting value, and cause the setting value to take the pre-start setting value.

2. The system for managing the railwayvehicle instrument according to claim 1, wherein the database is a first database, the system further comprising: a second database to store a correspondence information group, and add, to the correspondence information group, correspondence information indicating that old and new temporary identifiers of the temporary identifiers assigned to pieces of instrument information indicating the operation or the state of the railway vehicle instrument are associated with each other; and wherein the ground computer is further configured to extract primary instrument information assigned to a primary temporary identifier from the instrument information group, and, in a case where i is each integer from 1 to n, extract an (i + 1)-th order temporary identifier associated with an i-th order temporary identifier from the correspondence information group, and extract (i + 1)-th order instrument information assigned with the (i + 1)-th order temporary identifier from the instrument information group wherein n is an integer of 1 or more.

3. The system for managing the railwayvehicle instrument according to claim 1, wherein the instrument information includes an instrument information value having a property of monotonously increasing or decreasing as time passes, and the estimation process includes a first estimation process of selecting a first temporary identifier and a second temporary identifier from the temporary identifier group, and including the first temporary identifier and the second temporary identifier in the temporary identifiers assigned to pieces of instrument information indicating the operation or the state of the railway vehicle instrument, such that (1) a first time zone in which at least one piece of first instrument information included in the instrument information group and assigned with the first temporary identifier has been collected is after a second time zone without being overlapped with the second time zone in which at least one piece of second instrument information included in the instrument information group and assigned with the second temporary identifier has been collected, (2) a relationship between at least one first instrument information value individually included in at least one piece of first instrument information and at least one second instrument information value individually included in at least one piece of second instrument information conforms to the property, and (3) a difference between an instrument information value collected first in at least one first instrument information value and an instrument information value collected last in at least one second instrument information value satisfies a condition of indicating continuity.

4. The system for managing the railway vehicle instrument according to claim 1, wherein the estimation process includes a second estimation process of, in a case where an end-time setting value read from a first railway vehicle instrument mounted to a first mounting position of a first composition included in the composition when the maintenance is ended, is same as a start-time setting value read from a second railway vehicle instrument mounted to a second mounting position of a second composition included in the composition when the maintenance is started, including, in the temporary identifiers assigned to pieces of instrument information indicating the operation or the state of the railway vehicle instrument, a first temporary identifier assigned to first instrument information indicating an operation or a state of a first railway vehicle instrument mounted to the first mounting position after the maintenance is ended, and a second temporary identifier assigned to second instrument information indicating an operation or a state of a second railwayvehicle instrument mounted to the second mounting position before the maintenance is started.

5. The system for managing the railway vehicle instrument according to claim 1, wherein the ground computer is further configured to present a plurality of candidates that can be the combination, and set a candidate selected from the plurality of candidates as the combination.

6. The system for managing the railway vehicle instrument according to claim 1, wherein the on-board computer is further configured to: hold a composition identifier identifying the composition of the train.

7. The system for managing the railway vehicle instrument according to claim 1, wherein the database adds the instrument information to the instrument information group, and adds the temporary identifier to the temporary identifier group.

8. The system for managing the railway vehicle instrument according to claim 1, wherein the position information includes a composition identifier identifying the composition of the train and an in-composition position information specifying each mounting position in the composition of the train.

9. The system for managing the railway vehicle instrument according to claim 8, wherein the composition of the train includes a vehicle having each mounting position, and the in-composition position information includes information specifying a position of the vehicle in the composition, and information indicating a type of railway vehicle instrument that can be mounted to each mounting position.

10. The system for managing the railway vehicle instrument according to claim 9, wherein the vehicle has a plurality of mounting positions that can be mounted with each railway vehicle instrument respectively mounted to each mounting position, and the in-composition position information further includes information specifying which of the plurality of mounting positions each mounting position is.

11. The system for managing the railway vehicle instrument according to claim 1, wherein the on-board computer is configured to: determine in-composition position information specifying each mounting position in the composition of the train, and update the to-be-updated identifier at a timing when replacement of a railway vehicle instrument mounted to a particular mounting position is possibly performed.

12. The system for managing the railway vehicle instrument according to claim 11, wherein the composition of the train includes a vehicle having each mounting position, the on-board computer is configured to detect off/on of power of the vehicle, and the timing is when the on-board computer detects the off/on.

13. The system for managing the railway vehicle instrument according to claim 11, wherein the on-board computer is further configured to execute a test function of testing a railway vehicle instrument mounted to each mounting position, wherein the timing is when the on-board computers executes the test function.

14. The system for managing the railway vehicle instrument according to claim 1, wherein the on-board computer is further configured to transmit, to the ground computer, the instrument information and the temporary identifiers assigned to the instrument information.

15. An on-board apparatus for managing a railway vehicle instrument, the on-board apparatus comprising: a computer coupled to a train, the computer configured to: collect instrument information indicating an operation or a state of each railway vehicle instrument respectively mounted to each mounting position that is each of at least one mounting position included in a composition of the train; update a to-be-updated identifier determined for each mounting position, and assign, to the instrument information, a temporary identifier including position information specifying each mounting position and the to-be-updated identifier; and transmit the instrument information and the temporary identifier to a ground apparatus physically separate from the train, the ground apparatus estimates a combination of temporary identifiers included in a temporary identifier group, the temporary identifiers being previously assigned, in a database, to pieces of instrument information indicating the operation or the state of the railway vehicle instrument, wherein the railway vehicle instrument is not a generic computer, wherein the composition of the train includes a vehicle having each mounting position, the railway vehicle instrument mounted to a mounting position holds a setting value even in a case where off/on of power of the vehicle is performed, the computer is configured to: (1) read a pre-start setting value to be taken by the setting value, from the railway vehicle instrument mounted to the mounting position when maintenance is started, write a start-time setting value unique to the mounting position tothe railway vehicle instrument mounted to the mounting position after reading the pre-start setting value, and cause the setting value to take the start-time setting value, and to (2) read an end-time setting value to be taken by the setting value, from the railway vehicle instrument mounted tothe mounting position when the maintenance is ended, write the pre-start setting value to the railway vehicle instrument mounted to the mounting position after reading the end-time setting value, and cause the setting value to take the pre-start setting value.

16. An on-board apparatus for managing a railway vehicle instrument, the on-board apparatus comprising: a computer coupled to a train, the computer configured to: collect instrument information indicating an operation or a state of each railway vehicle instrument respectively mounted to each mounting position that is each of at least one mounting position included in a composition of the train; determine necessary information required for setting, to the instrument information, a temporary identifier including position information specifying each mounting position and a to-be-updated identifier, the to-be-updated identifier being determined for each mounting position, and being updated; and transmit the instrument information and the necessary information to a ground apparatus, physically separate from the train, that (1) assigns the temporary identifier to the instrument information by using the necessary information, and (2) estimates a combination of temporary identifiers included in a temporary identifier group, the temporary identifiers being previously assigned, in a database, to instrument information indicating the operation or the state of the railway vehicle instrument, wherein the railway vehicle instrument is not a generic computer, wherein the composition of the train includes a vehicle having each mounting position, railway vehicle instrument mounted to a mounting position holds a setting value even in a case where off/on of power of the vehicle is performed, the computer is configured to: (1) read a pre-start setting value to be taken by the setting value, from the railway vehicle instrument mounted to the mounting position when maintenance is started, write a start-time setting value unique to the mounting position to the railway vehicle instrument mounted to the mounting position after reading the pre-start setting value, and cause the setting value to take the start-time setting value, and to (2) read an end-time setting value to be taken by the setting value, from the railway vehicle instrument mounted to the mounting position when the maintenance is ended, write the pre-start setting value to the railway vehicle instrument mounted to the mounting position after reading the end-time setting value, and cause the setting value to take the pre-start setting value.

* * * * *